United States Patent [19]

Ishiguro

[11] Patent Number: 5,189,461
[45] Date of Patent: Feb. 23, 1993

[54] RANGE FINDER FOR PASSIVE TYPE AUTOFOCUSSING DEVICE

[75] Inventor: Minoru Ishiguro, Ohmiya, Japan
[73] Assignee: Fuji Photo Optical Co., Ltd., Ohmiya, Japan
[21] Appl. No.: 846,166
[22] Filed: Mar. 5, 1992

[30] Foreign Application Priority Data

Mar. 6, 1991 [JP] Japan .................. 3-064617
Mar. 6, 1991 [JP] Japan .................. 3-065616
Mar. 6, 1991 [JP] Japan .................. 3-065618

[51] Int. Cl.$^5$ ................... G03B 13/36; G01C 3/08; H01J 40/14
[52] U.S. Cl. ................... 354/402; 356/4; 250/201.6
[58] Field of Search ............... 354/402, 403, 406, 407, 354/408; 250/201.6; 356/1, 4

[56] References Cited

U.S. PATENT DOCUMENTS 4,387,975 6/1983 Araki .................. 354/408

*Primary Examiner*—W. B. Perkey
*Attorney, Agent, or Firm*—Price, Heneveld, Cooper, DeWitt & Litton

[57] ABSTRACT

A range finder for a passive type autofocussing device arranged so that light rays emitted from a scene to be photographed are picked up by three photosensors, output signals therefrom representing a luminance distribution of the scene are A/D converted, the zero-cross points of secondary differences of these digitized values are detected, zero-cross signals are compared with one of said three photosensors being selected as a reference and the zero-cross behaviors associated with the other two photosensors being successively shifted relative to said reference until a coincidence of the zero-cross behaviors associated with said three photosensors is detected, and a range to the scene is computed based on an amount that the zero-cross behaviors associated with said other two photosensors have been shifted until the coincidence is detected. Alternatively, said secondary differences of the digitized values are interpolated to detect the zero-cross points. Alternatively, the secondary difference of the luminance distribution is interpolated to compute and detect a zero-cross point and a range to the scene is found based on a coincidence of the zero-cross behaviors associated with the three photosensors.

6 Claims, 20 Drawing Sheets

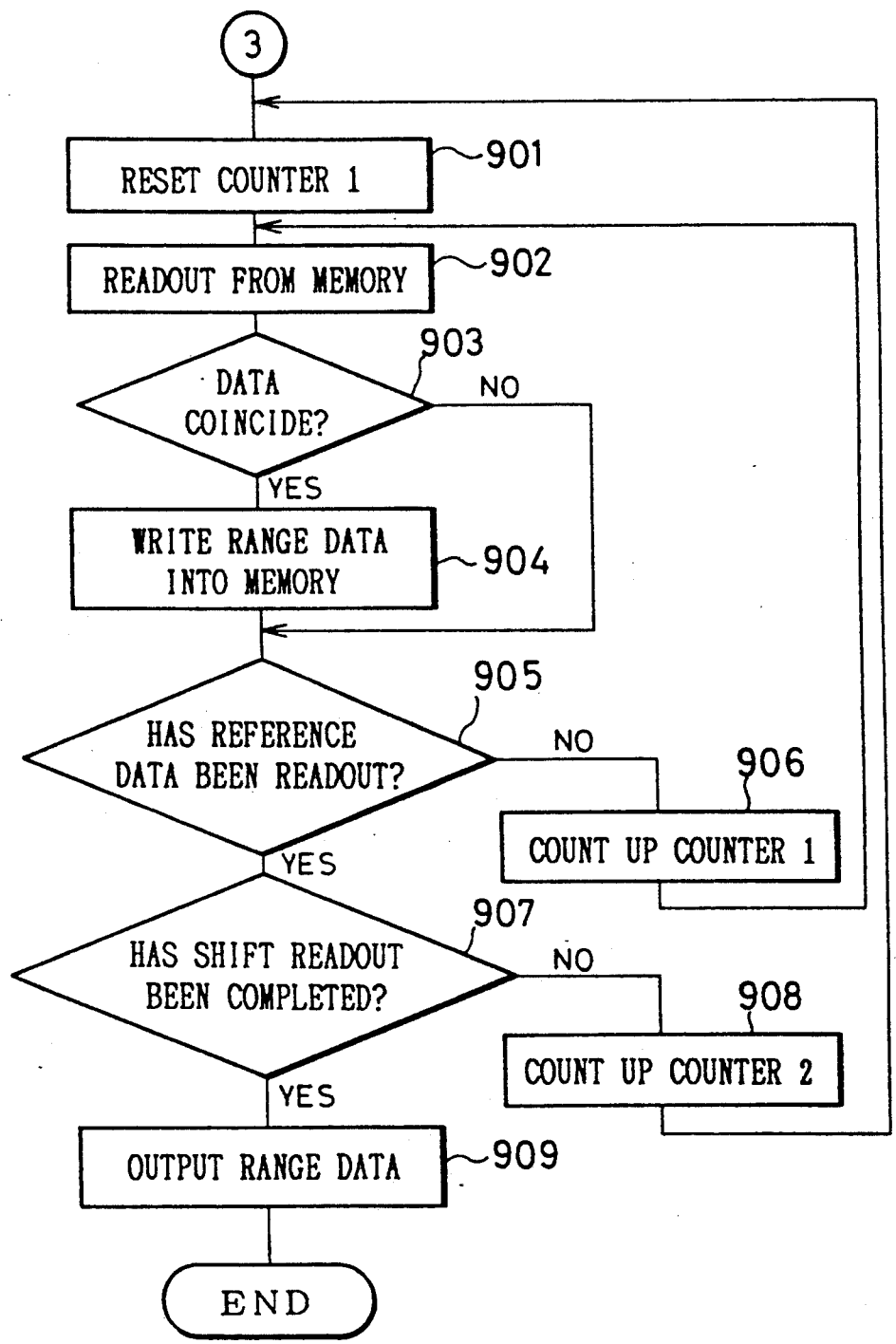

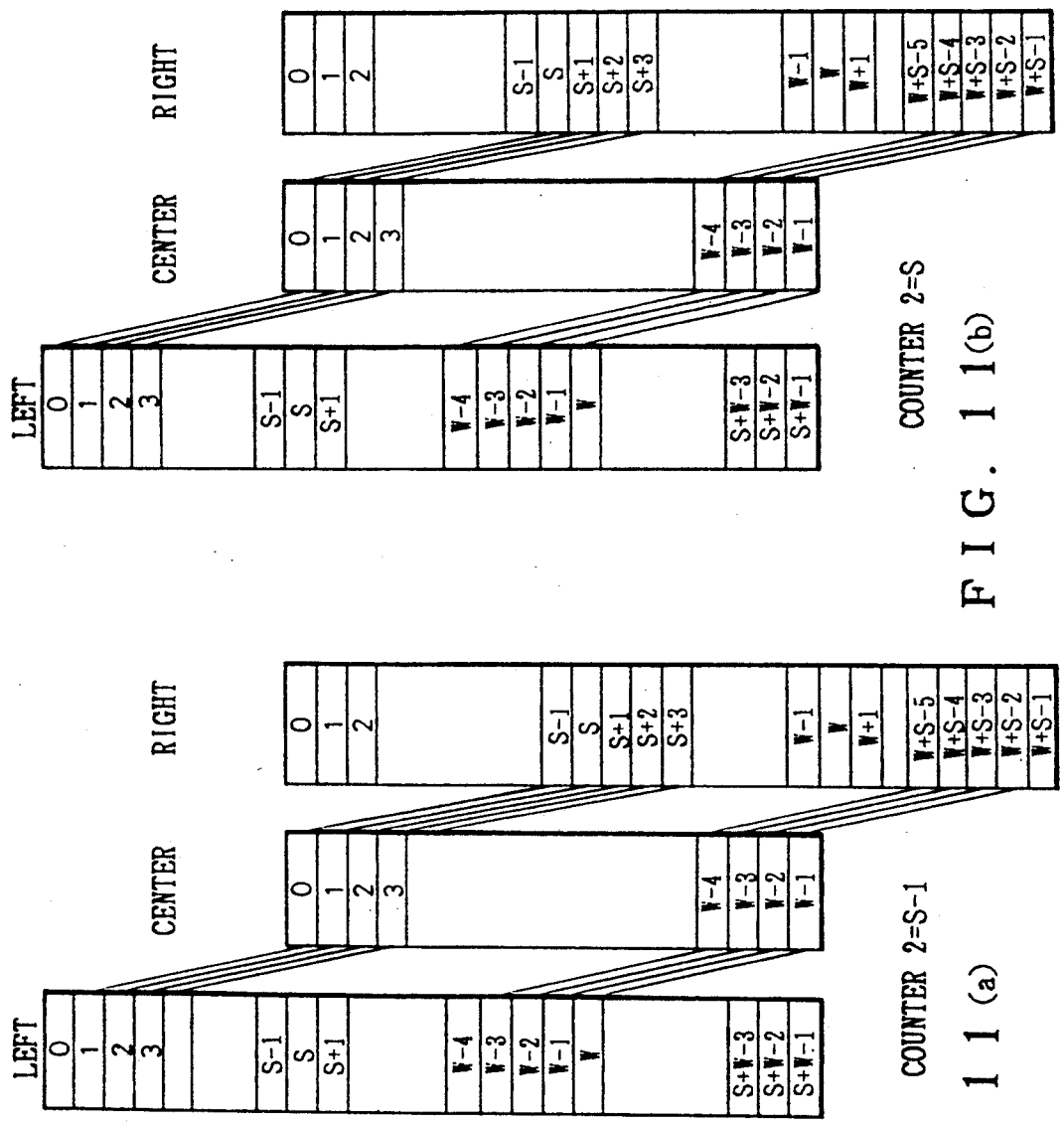

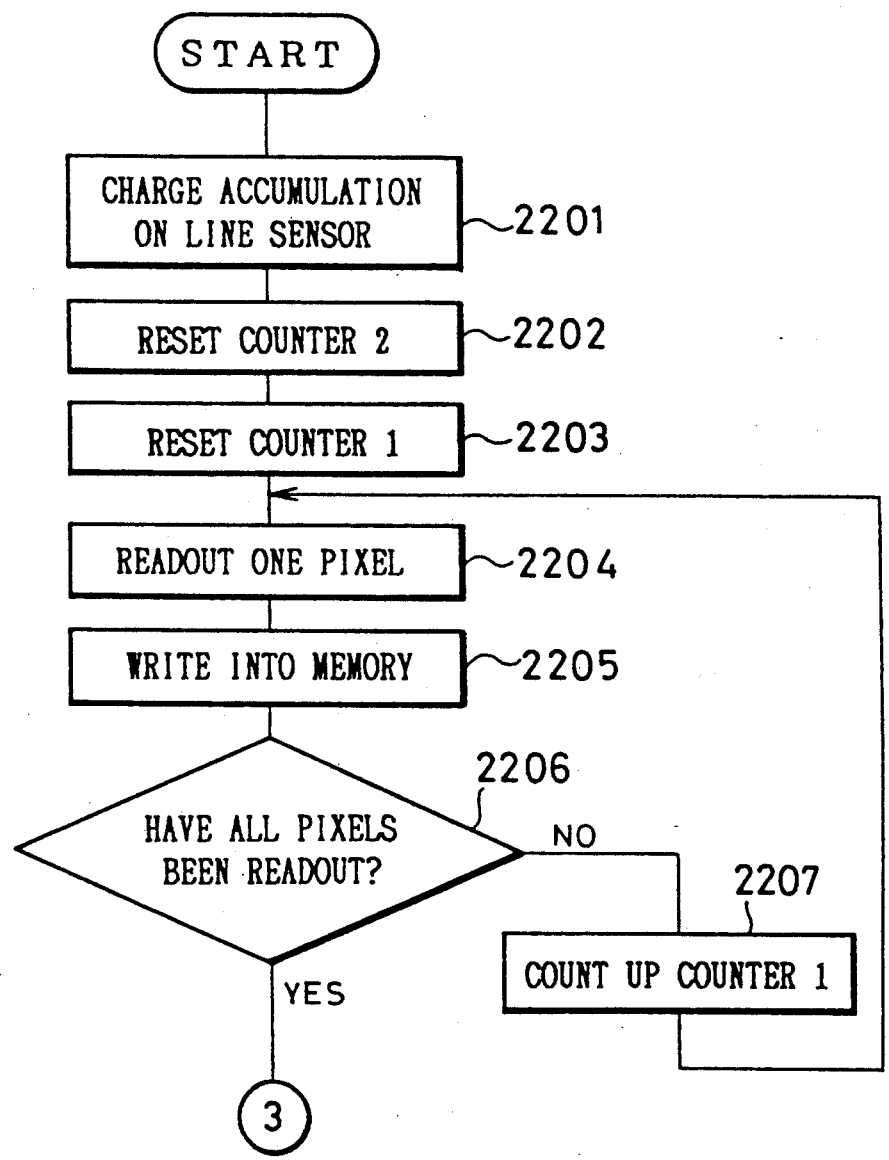

RANGE FINDER FOR PASSIVE TYPE AUTOFOCUSSING DEVICE

BACKGROUND OF THE INVENTION

1. Technical Field

This invention relates to a range finder for passive type autofocussing device so-arranged that light rays emitted from a scene to be photographed are picked up to find a range to said scene and the objective is adjustably brought into focus based on a result of said range finding.

2. Prior Art

The autofocussing device is used to find a shooting range for photographic camera or the like in automatic mode and to bring the objective into focus based on a result of the range finding and such autofocussing device allows everyone to enjoy photographing easily. Various types of autofocussing device have already been developed and most of them employ the trigonometrical range finding method. Typical autofocussing device relying on this trigonometrical range finding method is so-called passive type autofocussing device adapted to pick up light rays emitted from the scene by photosensors provided on the camera and thereby to find a shooting range.

Some of the passive type autofocussing devices include a pair of photosensors. However, if the scene includes two objects being in contrast with each other, such range finder provided with a pair of photosensors disadvantageously indicates two different states of the single scene to be photographed and consequently can not achieve a reliable range finding, necessarily resulting in a picture which is out of focus.

To assure a reliable range finding and thereby to obtain a well-focused picture, the applicant of this application has previously proposed a range finding mechanism comprising three photodetector arrays (Japanese Patent Application No. 1989-177382, Japanese Patent Application Disclosure No. 1991-42642). A principle of range finding by this range finding mechanism will be described in reference with FIGS. 23 and 24 of the attached drawing. The range finding mechanism comprises a reference photosensor 1, a first photosensor 2 and a second photosensor 3. These photosensors 1, 2, 3 comprise, in turn, imagining lenses 1a, 2a, 3a and photodetector arrays 1b, 2b, 3b, respectively, so that a scene to be photographed is imaged through the imagining lenses 1a, 2a, 3a on the photodetector arrays 1b, 2b, 3b, respectively. FIG. 23 illustrates a case in which the scene P comprises a single object. Now, referring to FIG. 23, $x_0$ represents a displacement of an output signal $P_0$ relating to a luminance distribution of the object P detected by the reference photodetector array 1b with respect to an optical axis $T_0$ of the reference photosensor 1, $x_1$ represents a displacement of an output signal $P_1$ relating to a luminance distribution on the object P detected by the first photodetector array 2b with respect to an optical axis $T_1$ of the first photosensor 2, and $x_2$ represents a displacement of an output signal $P_2$ relating to a luminance distribution on the object P detected by the second photodetector array 3b with respect to an optical axis $T_2$ of the second photosensor 3. These displacements $x_0$, $x_1$, $x_2$ represents phase differences relating to the luminance distribution on the object detected by the photodetector arrays 1b, 2b, 3b, respectively. Assume that the optical axes $T_0$, $T_1$, $T_2$ are spaced from one another by B, photodetective surfaces of the photodetector arrays 1b, 2b, 3b are spaced from the respective imaging lenses 1a, 2a, 3a by A, and the object P lies at a distance Lp from the imagining lenses 1a, 2a, 3a and at a distance X from the optical axis $T_0$, the following equation is derived from the principle of trigonometrical survey:

$$X = x_0 \cdot Lp/A \qquad (1).$$

If a direction in which the output signal image appears with respect to the optical axis $T_0$ is taken into account, $$-x_1 = (B-X)/Lp \cdot A \qquad (2)$$

$$x_2 = (B+X)/Lp \cdot A \qquad (3).$$

If the equation (1) is substituted for these equations (2), (3), respectively, $$x_1 = (B/Lp) \cdot A + x_0 \qquad (4)$$

$$x_2 = (B/Lp) \cdot A + x_0 \qquad (5).$$

Comparison of the equations (4) and (5) indicates that $x_1$ and $x_2$ are displaced with respect to a reference $x_0$, respectively, by an amount $$(B/Lp) \cdot A = Xp \qquad (6).$$

Accordingly, this Xp may be obtained to compute $$Lp = A \cdot B/Xp \qquad (7).$$

Procedure used to obtain said Xp will be explained in reference with FIG. 24. Referring to FIG. 24, (a) illustrates output signals relating to the luminance distribution detected by the photodetector arrays 1b, 2b, 3b exposed to light rays emitted from two objects with respect to reference output signals $P_0$, $Q_0$. From the state of (a), the output signal waveforms $P_1$, $P_2$ may be shifted with respect to said output waveform $P_0$ until these output signal waveforms $P_0$, $P_1$, $P_2$ coincide with one another to obtain an amount of said displacement Xp. More specifically, at this moment of coincidence, $P_1$ and $P_2$ have been displaced by an equal amount. Accordingly, when said three output signal waveforms coincide with one another after the output signal of the photodetector array 2b and the output signal of the photodetector array 3b have been shifted by an equal amount, the waveforms of these three output signals will provide the data relating to the same object P. Next, as illustrated by (c), the output signal $Q_1$, $Q_2$ may be shifted with respect to the output signal $Q_0$ until said output signal $Q_1$, $Q_2$ coincide with the output signal $Q_0$ to obtain an amount of the displacement Xq.

Based on said Xp, Xq obtained in the manner as has been described above, the ranges Lp, Lq to the objects P, Q, respectively, are computed according to said equation (7).

SUMMARY OF THE INVENTION

However, the above-mentioned range finding procedure of prior art principally comprises steps of computing a correlation between the output signal of the reference photodetector array 1b and the output signal of the first photodetector array 2b, then computing a correlation between the output signal of the reference photodetector array 1b and the output signal of the second photodetector array 3b and finally detecting a coincidence of the output signal waveforms of the reference photodetector array 1*b*, the first photodetector array 2*b* and the second photodetector array 3*b*. As will be readily understood, such repeated computation of correlations necessary prolongs the signal processing time. In a consequence, a time taken for range finding becomes inconveniently longer and a dynamic object might be photographed out of focus, resulting in a blurred picture.

In view of the problem as has been mentioned above, it is a principal object of this invention to provide an improved range finder equipped with three photosensors, which allows signal processing to be rapidly performed and an optically focused picture to be obtained.

To achieve the object set forth above, the invention resides in a range finder for passive type autofocussing device, said range finder comprising a photosensor to pick up a luminance distribution on a scene to be photographed, said photosensor consisting of a single line sensor divided into three sections and three imaging lenses adapted to image the scene on the respective sections of the line sensor, a single secondary difference computing circuit to A/D convert an output signal from said line sensor and to compute a secondary difference of the digitalized value, a single zero-cross detecting circuit to detect a zero-cross point of an output signal from said secondary difference computing circuit, zero-cross memory circuits associated with said three sections of said line sensor, respectively, for storage of zero-cross behavior signals provided from said zero-cross detecting circuit, and a coincidence detecting circuit adapted to compare the zero-cross behavior signals stored in said respective zero-cross memory circuits with one another and thereby to detect a coincidence of these zero-cross behavior signals, wherein one of said three line sensor sections is selected as a reference line sensor section and the zero-cross behavior signals provided from the other two sections are successively shifted relative to the zero-cross behavior signal provided from said reference section until a coincidence of these zero-cross behavior signals is detected by said coincidence detecting circuit and a range to the scene is computed from a quantity of said shift.

With such arrangement, photodetector arrays constituting said photosensors provide output voltages corresponding to the luminance distribution on the scene and secondary difference distribution of the respective output voltages behaves across the zero level. For the luminance distribution on the same portion of the scene, the zero-cross behaviors associated with said three line sensor sections become same but with some displacement relative to a given reference. An amount of this displacement corresponds to an amount by which said coincidence detecting circuit has shifted the zero-cross behavior signal waveforms until a coincidence thereof is detected. Based on this amount of shift, a range to be scene can be computed according to the principle of trigonometrical survey.

Said detection of the zero-cross point is carried out through computation of the zero-cross behavior by interpolating the output signal from said secondary difference computing circuit.

The invention resides also in a range finder for passive type autofocussing device, said range finder comprising three photosensors to pick up a luminance distribution of a scene to be photographed, secondary difference computing circuits to compute secondary differences of output signals from said respective photosensors, zero-cross detecting circuits to interpolate output signals from said respective secondary difference computing circuits and thereby to detect zero-cross points of said output signals, zero-cross memory circuits in which the zero-cross behavior signals provided from said respective zero-cross detecting circuits are stored, and a coincidence detecting circuit adapted to compare the zero-cross behavior signals stored in said respective zero-cross memory circuits with one another and thereby to detect a coincidence of these zero-cross behavior signals, wherein one of said three photosensors is selected as a reference photosensor and the zero-cross behavior signals provided from the other two photosensors are successively shifted relative to the zero-cross behavior signal provided from said reference photosensor until a coincidence of these zero-cross behavior signals is detected by said coincidence detecting circuit and a range to the scene is computed from an amount of said shift.

BRIEF DESCRIPTION OF THE DRAWING

FIG. 9 is a flow chart of the routine executed to read a given data from the zero-cross memory circuits in order to detect the data stored in said zero-cross memory circuits;

FIGS. 11(*a*) and 11(*b*) comprise a diagram illustrating the procedure executed to read and compare the data stored in the zero-cross memory circuits;

FIG. 22 is a flow chart of the routine executed in the third embodiment to write the data provided from the line sensor into the zero-cross memory circuits;

DETAILED DESCRIPTION OF THE INVENTION

Figure 12:
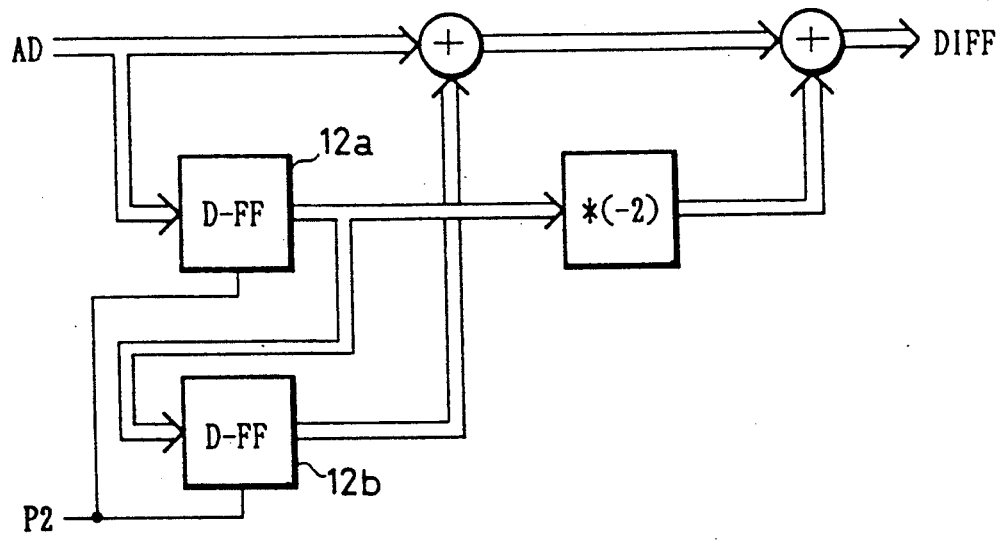
FIG. 12 is a circuit block diagram of the secondary difference computing circuit in a second embodiment, which is adapted to A/D convert the output from the line sensor, followed by digitally processing, and to compute the secondary difference thereof.
Figure 13:
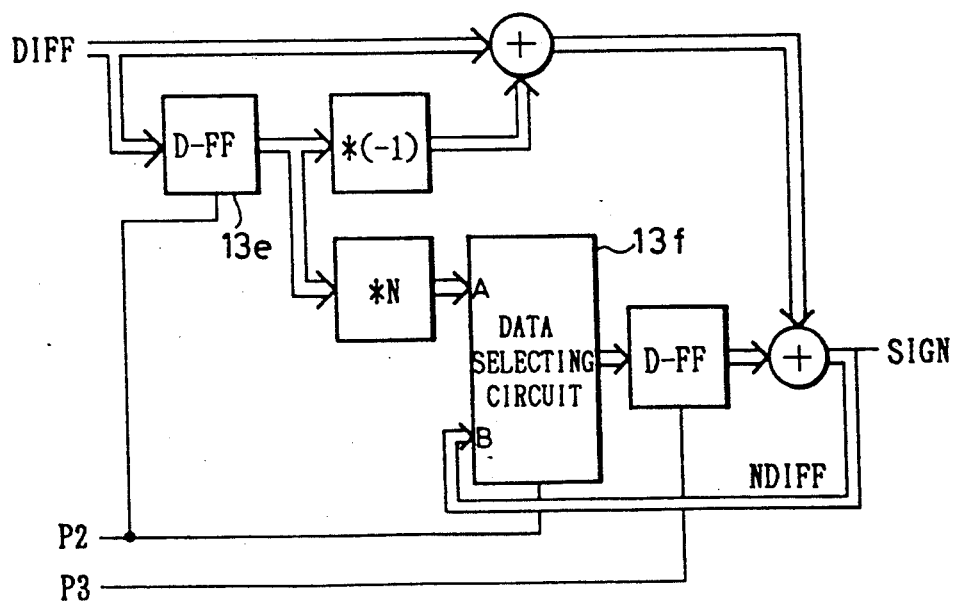
FIG. 13 is a block diagram showing an interpolation computing circuit in the second embodiment, which is adapted for digitally processing the linearly approximating the output signal from the secondary difference computing circuit in order to interpolate said signal.
Figure 14:
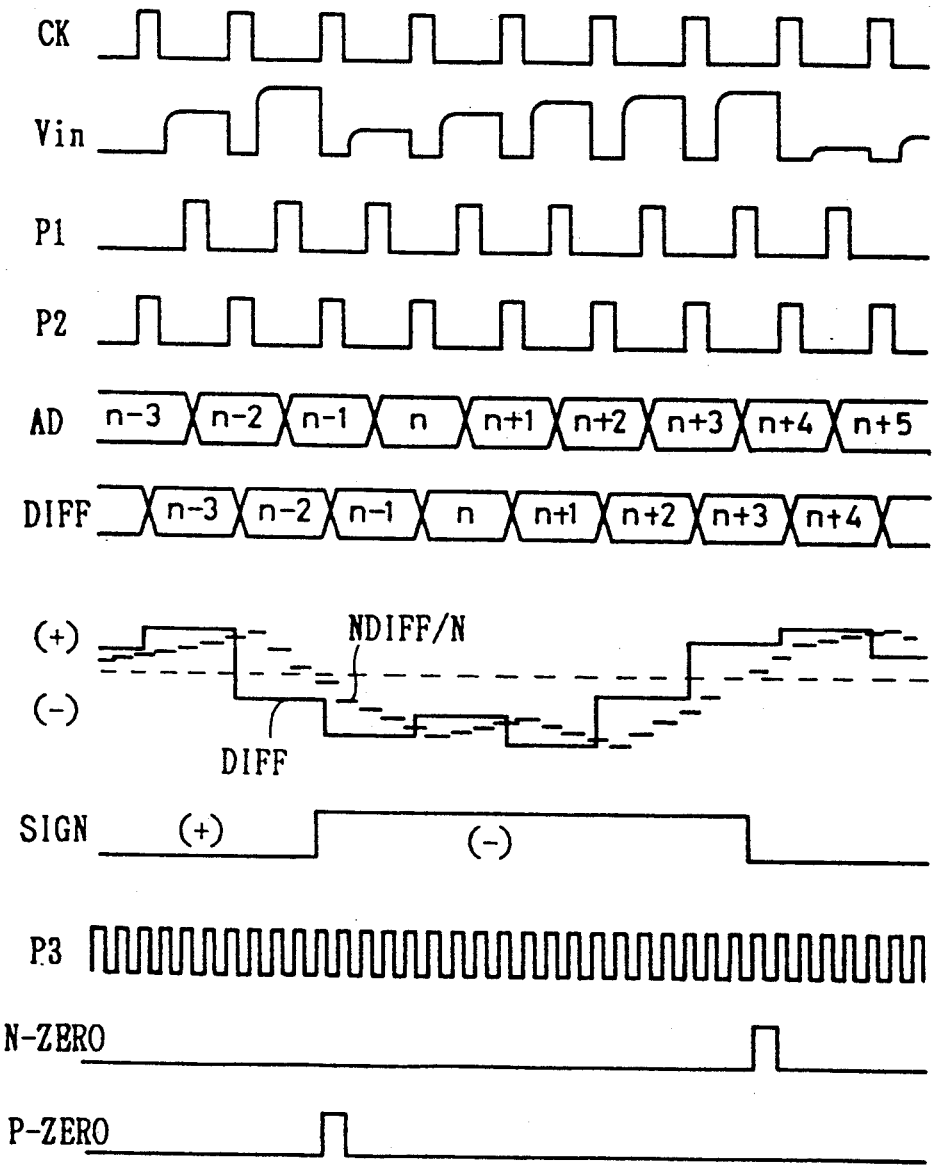
FIG. 14 is a time chart for output signals from the line sensor and the A/D converter, the secondary difference computing circuit, respectively, in the second embodiment.

The range finder for autofocussing device of the invention will be described more specifically in reference with the attached drawing. It should be understood that FIGS. 1 through 11 illustrate the first embodiment; FIGS. 12 through 14 illustrate the second embodiment; and FIGS. 15 through 22 illustrate the third embodiment.

FIRST EMBODIMENT

Figure 2:
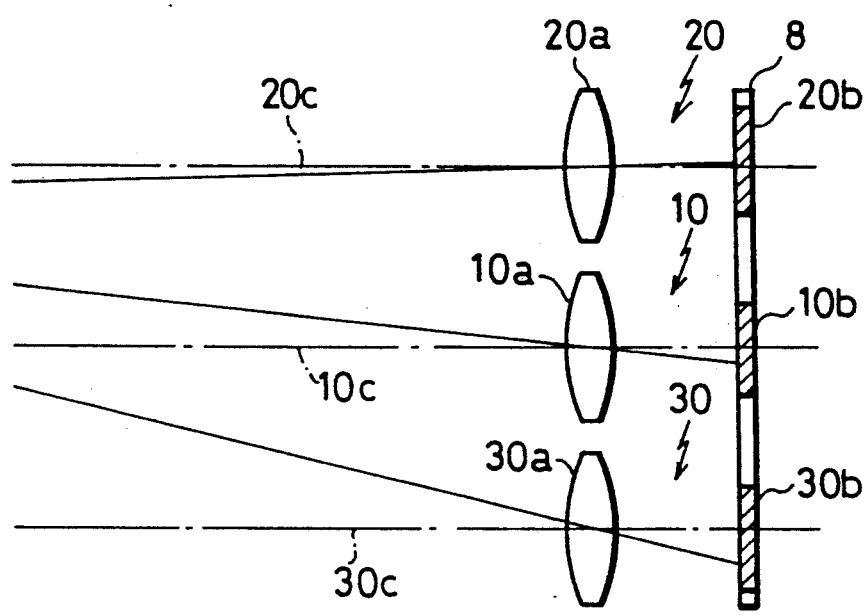
FIG. 2 is a side view schematically showing the photosensors in the first embodiment.

Photosensors 10, 20, 30 comprises a combination of a single line sensor 8 and three imaging lenses 10a, 20a, 30a, and said single line sensor comprises, in turn, photodetector arrays each including an appropriate number of pixels arranged side by side. Referring to FIG. 2, there are provided on the front side of the photographic camera said three imaging lenses 10a, 20a, 30a so that the light rays emitted from a scene to be photographed pass through these imaging lenses 10a, 20a, 30a and the scene is imaged on respective sections of the line sensor 8 placed behind them. Accordingly, the line sensor 8 is divided into three sections which are designated here as the central section 10b, the right side section 20b and the left side section 30b of the line sensor. These photosensors 10, 20, 30 are designated here as the central sensor 10, the right side sensor 20 and the left side sensor 30 with optical axes 20c, 30c of said right side sensor 20 and said left side sensor 30, respectively, being arranged symmetrically with respect to an optical axis 10c of the central sensor 10.

Figure 1:
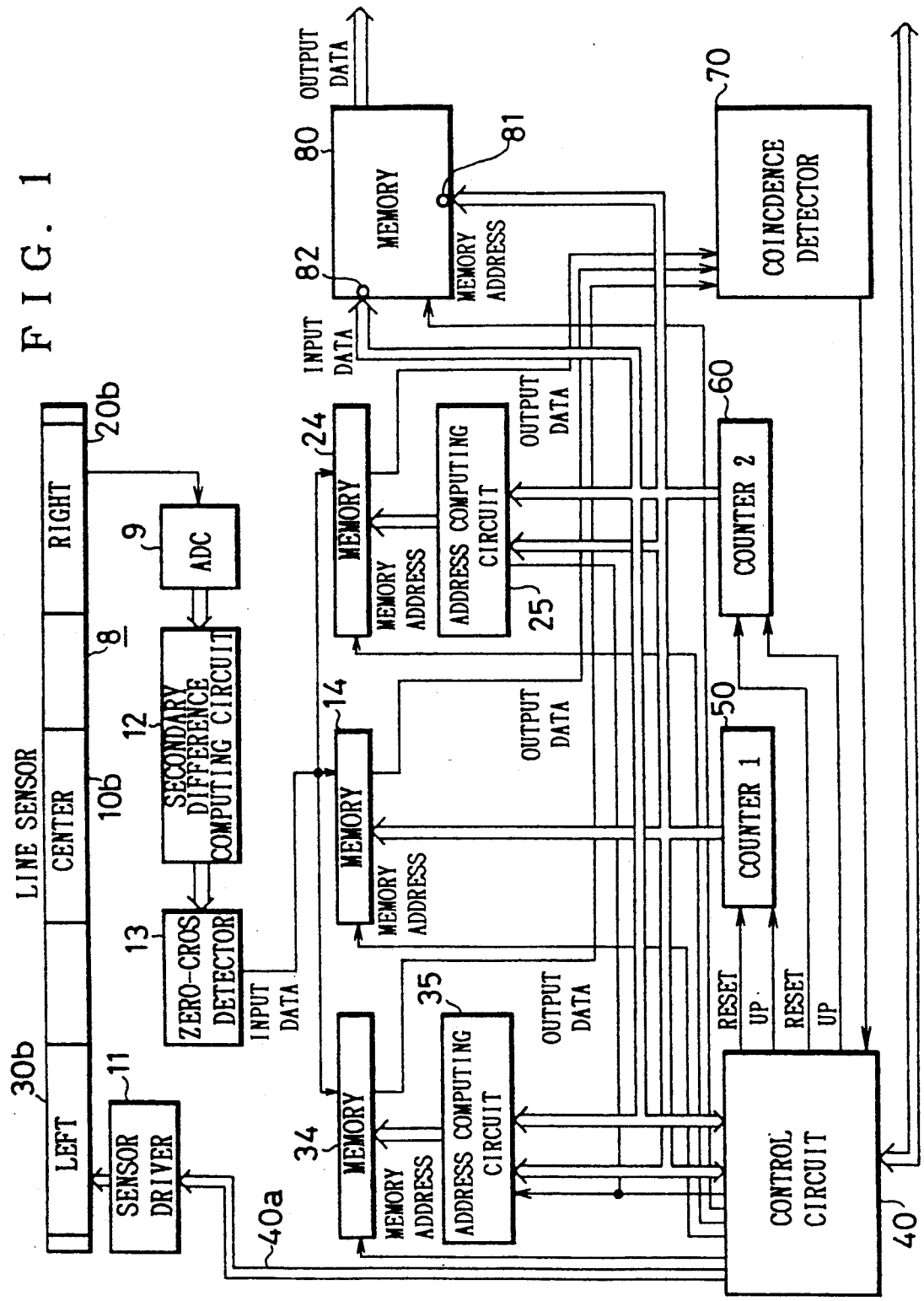
FIG. 1 is a block diagram showing a first embodiment of the range finder for passive type autofocussing device constructed in accordance with the invention.

Said line sensor 8 is applied, as shown in FIG. 1, with a driver signal from a sensor driver 11 and begins to pick up the light rays coming from the scene on the basis of said driver signal. The sensor driver 11 is connected to a control circuit 40 via a drive control signal link 40a and controlled by a drive control signal from said control circuit 40.

Figure 3:
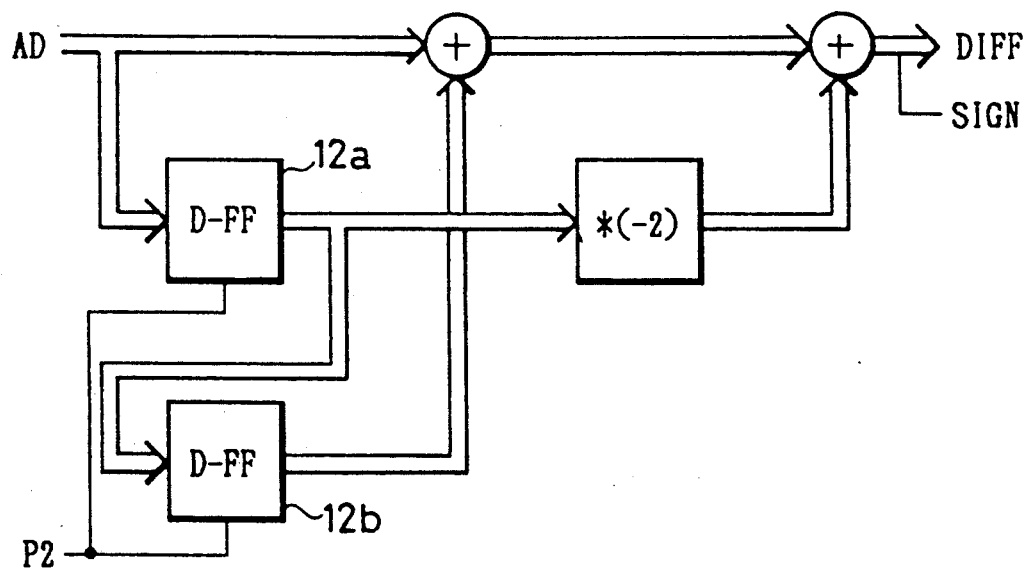
FIG. 3 is a circuit block diagram showing the secondary difference computing circuit in the first embodiment, which is adapted to A/D convert the output from the line sensor, followed by digitally processing, and to compute the secondary difference thereof.

As will be apparent from FIG. 1, an A/D converter 9 is connected to an output terminal of said line sensor 8 and A/D converts the output signal of the line sensor 8. A secondary difference computing circuit 12 is connected to the output side of said A/D converter 9 and computes a secondary difference of the luminance distribution signal provided from the line sensor 8. Referring to FIG. 3, said secondary difference computing circuit 12 successively stores the output signals AD of the A/D converter 9 synchronously with clock pulses P2 into memory circuits 12a, 12b, comprising D flip-flops and computes $$DIFF(n) = AD(n-2) - 2 \cdot AD(n-1) + AD(n) \tag{8}$$

to obtain the secondary difference. Plus or minus (SIGN) of the current DIFF value is also given by this computation.

As illustrated in FIG. 1, the output signal of said secondary difference computing circuit 12 is applied to the zero-cross detecting circuit 13 which detects then a zero-cross point of the secondary difference provided from the secondary difference computing circuit 12. As will be seen in FIG. 4 a sign output SIGN of the secondary difference computing circuit 12 is applied to a D flip-flop 13a of the zero-cross detecting circuit 13, said sign output SIGN and $\overline{Q}$ terminal of D flip-flop 13a are tied to an AND circuit 13b, and output signal from an inverter 13c which is applied with said output is coupled together with Q terminal of the flip-flop 13a to an AND circuit 13b.

Figure 5:
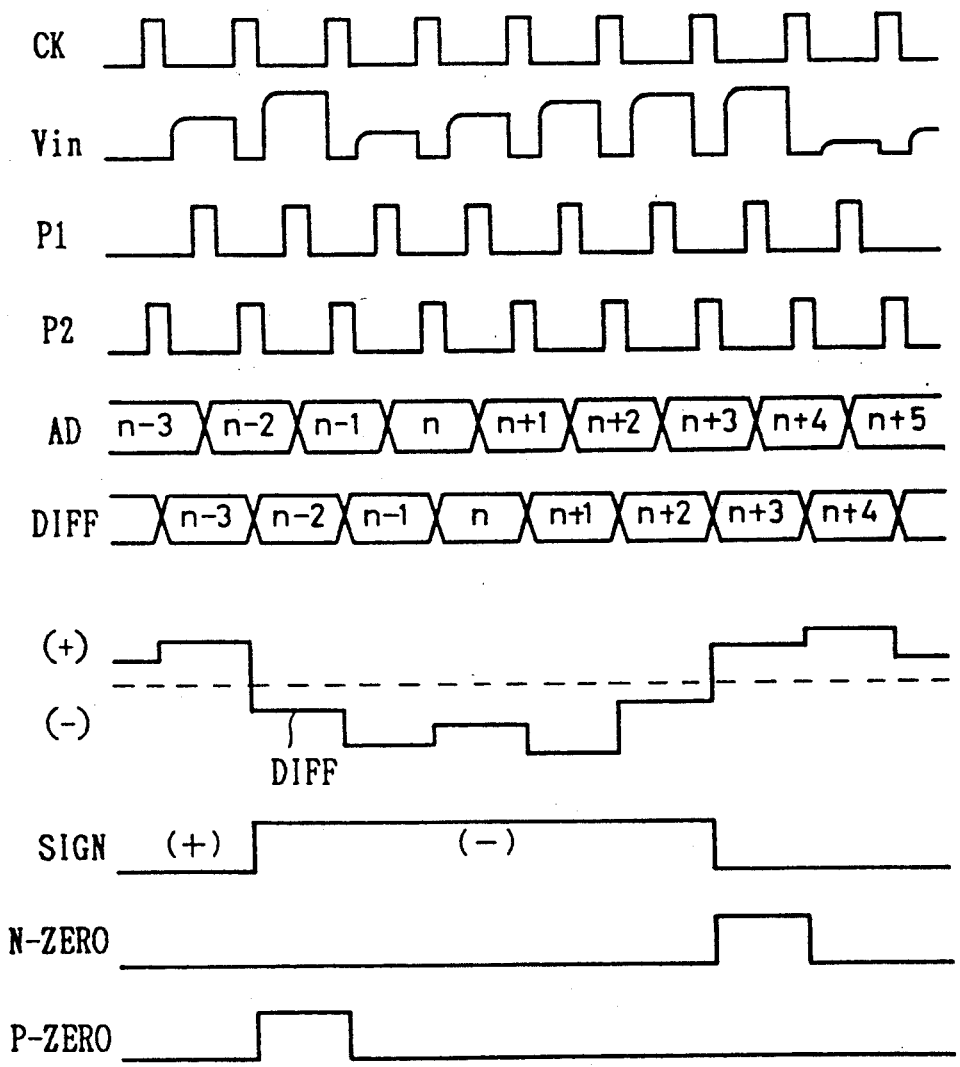
FIG. 5 is a time chart for output signals from the line sensor and the A/D converter, the secondary difference computing circuit and the zero-cross detecting circuit, respectively, in the first embodiment.
Figure 6:
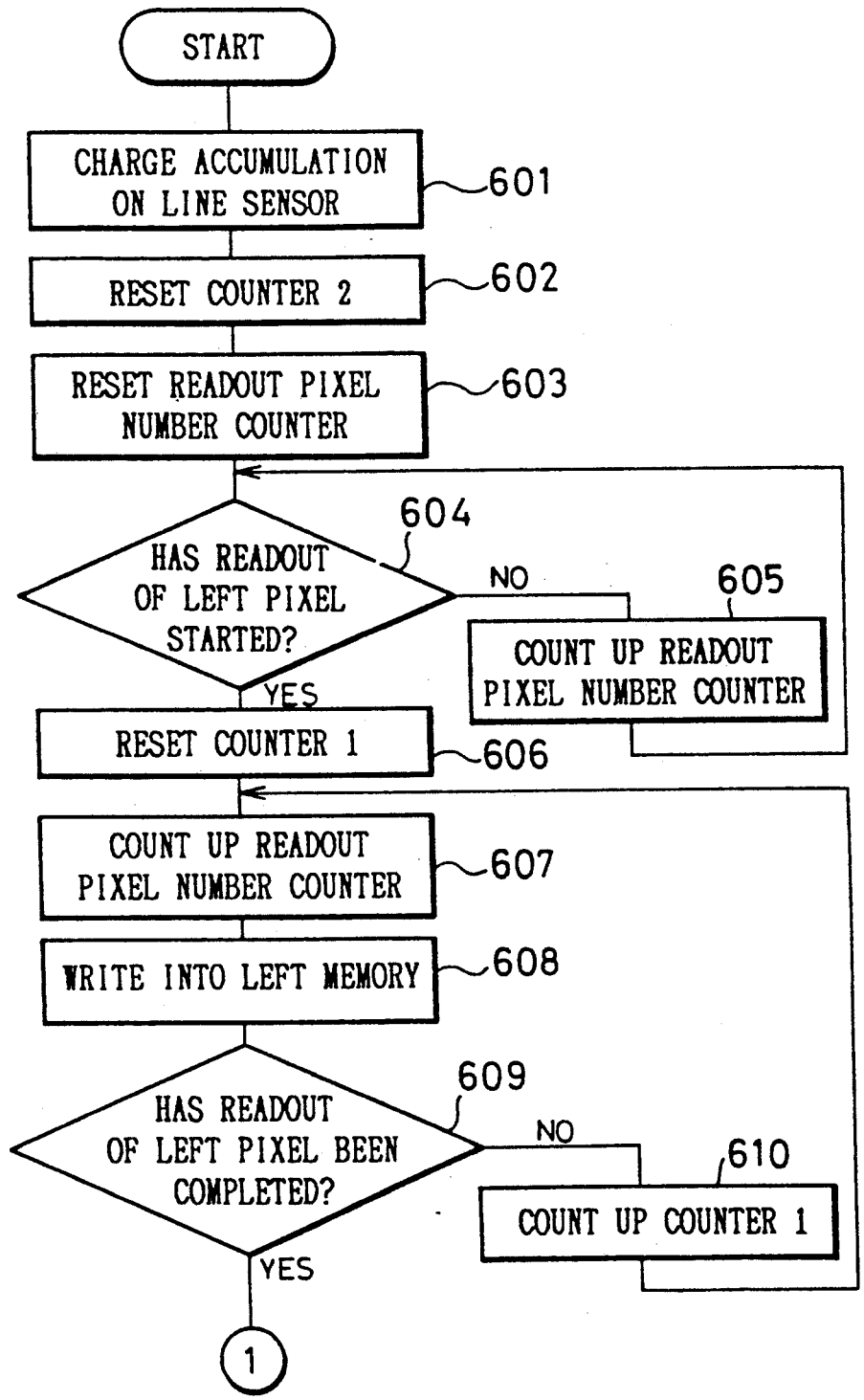
FIG. 6 is a flow chart of the routine executed in the first embodiment to write the data obtained from the left side section of the line sensor into the associated zero-cross memory circuit.
Figure 7:
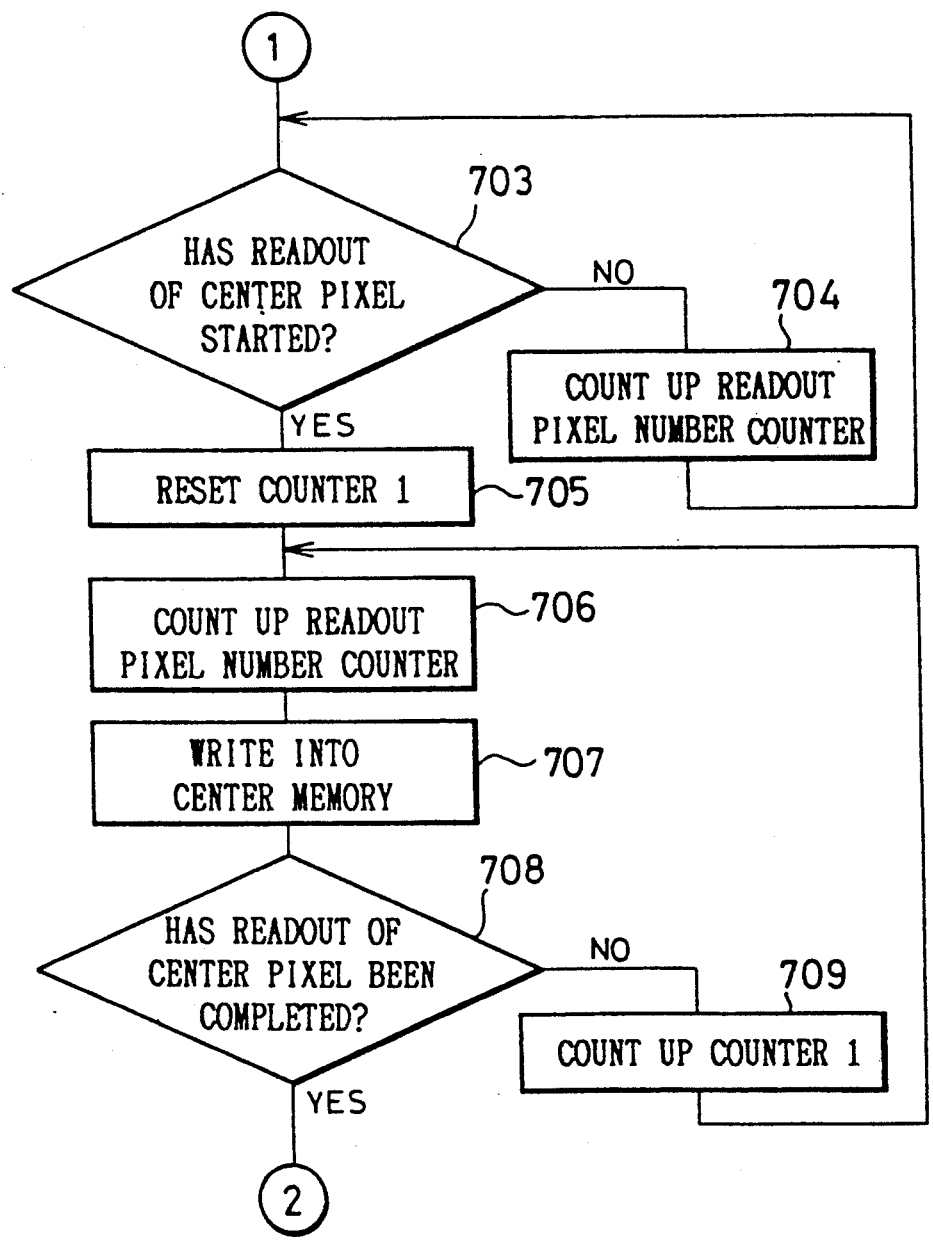
FIG. 7 is a flow chart of the routine executed in the first embodiment to write the data obtained from the central section of the line sensor into the associated zero-cross memory circuit.
Figure 8:
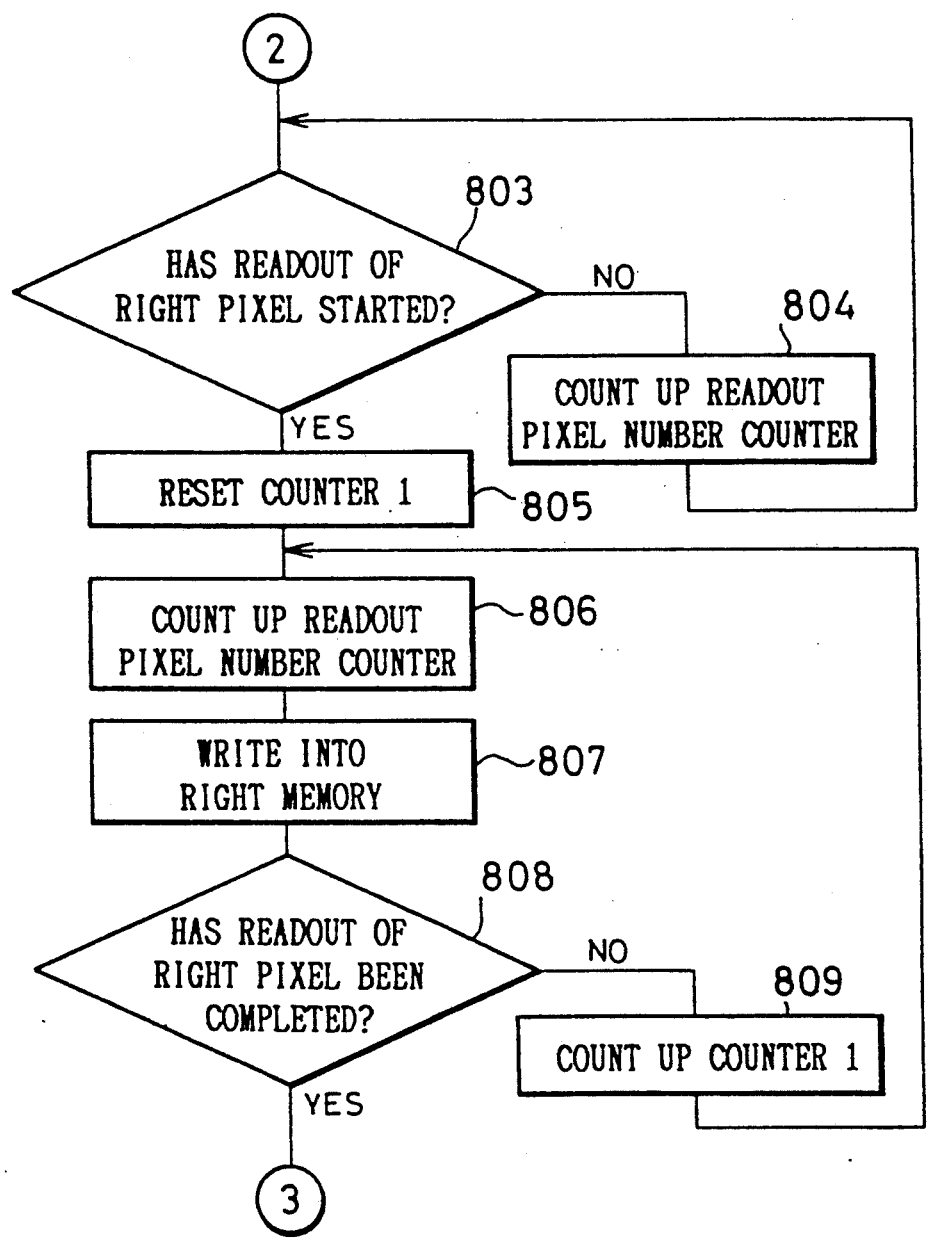
FIG. 8 is a flow chart of routine executed in the first embodiment to write the data obtained from the right side section of the line sensor into the associated zero-cross memory circuit.

As will be apparent from the time chart of FIG. 5, the output signal Vin of the line sensor 8 is applied to the A/D converter 9 which then A/D converts the signal Vin and provides the output signal AD. This output signal AD is applied to the secondary difference computing circuit 12 which provides, in turn, the signal DIFF and the sign signal SIGN synchronously with the clock pulse P2. Upon application of the sign signal SIGN to the zero-cross detecting circuit 13, the AND circuit 13b outputs a zero-cross signal in the form of a pulse P-ZERO which rises up as the sign signal SIGN changes from L to H while the AND circuit 13d outputs a zero-cross signal in the form of a pulse N-ZERO which rises up as the sign signal SIGN changes from H to L and these zero-cross signals are output synchronously with the clock pulse P2. In other words, the pulse P-ZERO is the signal which rises up as the secondary difference signal DIFF changes from positive to negative and zero-crosses while the pulse N-ZERO is the signal which rises up as the secondary difference DIFF changes from negative to positive and zero-crosses.

A zero-cross behavior signal waveform provided from said zero-cross detecting circuit 13 is divided into a portion associated with the central section 10b, a portion associated with the right side section 20b and a portion associated with the left side section 30b of the line sensor 8 and, as seen in FIG. 1, these portions are separately applied to and stored in respective zero-cross memory circuits 14, 24, 34. These zero-cross behavior signal waveform portions are also stored, for the right side section 20b and the left side section 30b of the line sensor 8, in addresses which are output from respective address computing circuits 25, 35 according to the pixel locations and, for the central section 10b of the line sensor 8, in an address given by a count signal (COUNTER 1) from a first counter 50. More specifically, the count signals (COUNTER 1) from the first counter 50 are applied to the address computing circuits 25, 35 and the central memory circuit 14 for successively increment. Thus, said zero-cross behavior signal waveform portions are stored in the respective addresses corresponding to the respective pixels in accordance with the following equations:

ADDRESS=COUNTER 1  (9)

for the central memory circuit 14,

ADDRESS=COUNTER 1  (10)

for the right side memory circuit 24, and

ADDRESS=COUNTER 1  (11)

for the left side memory circuit 34.

Count signal (COUNTER 2) from a second counter 60 is applied to said address computing circuits 25, 35. Count up and reset of said second counter 60 and said first counter 50 are under control of output signal from the control circuit 40. The second counter 60 increments the address for every read-out of data from the zero-cross memory circuits 24, 34, as will be described later. The address computing circuits 25, 35 are supplied from the control circuit 40 with address processing information on the basis of which the address computing circuits 25, 35 output predetermined write/read signals into and from the zero-cross memory circuits 24, 34.

A coincidence detecting circuit 70 is connected to the output side of said zero-cross memory circuits 14, 24, 34 and the output side of this coincidence detecting circuit 70 is connected to the control circuit 40.

The count signal from the first counter 50 is applied to an address port 81 of a data memory circuit 80 while the count signal from the second counter 60 is applied to a range data port 82 of said data memory circuit 80. Both the count signals from the first counter 50 and the second counter 60 are also applied to the control circuit 40. The control circuit 40 supplies the data memory circuit 80 with a data memory signal on the basis of which the address data and the range data are stored in data memory circuit 80.

Now referring to FIGS. 6 through 9, a routine to write and read the luminance information memory for a scene to be photographed will be described.

Upon start of range finding, charge accumulation occurs on the line sensor 8 (step 601), then the second counter 60 is reset (step 602), and a read-out pixel number counter (not shown) provided with the control circuit 40 is reset (step 603).

Now it is determined from a count value of the read-out pixel number counter whether read of a first pixel in the left side section 30b of the single line sensor 8 started or not (step 604) and the pixels are output one by one (step 605) until the data corresponding to said first pixel begins to be read-out. When said first pixel begins to be read-out, the first counter 50 is reset (step 606). The data corresponding to one pixel in the left side section 30b of the line sensor 8 is read-out (step 607) and this read-out data is written into the left side zero-cross memory circuit 34 (step 608). It should be understood that a zero-cross detection is executed between the steps 607 and 608. Next, the routine proceeds to a step 609 to determine whether read-out concerning all the pixels has been completed or not, based on a count value of the first counter 50. If not, the routine proceeds to a step 610 to count up the first counter 50 and then returns to the step 607 to read one pixel, followed by writing it into the left side zero-cross memory circuit 34 (step 608). The data written into the zero-cross memory circuit 34 is stored in the address assigned by the address computing circuit 35, based on the count signal from the first counter 50. The address in which the data is to be stored is assigned according to the above-mentioned equation (11).

If read-out of all the pixels in the left side section 30b of the line sensor 8 has been completed and thus conclusion of said step 609 is YES, the routine proceeds to a step 703 (FIG. 7) to detect read-out of the first pixel in the central section 10b of the line sensor based on a count value of the read-out pixel number counter and the pixels are output one by one (step 704) until read-out of said first pixel starts. If read-out of said first pixel has started, the first counter 50 is reset (step 705) and then said steps 607 through 610 are repeated. Namely, the pixels in the central section 10b of the line sensor are read-out one by one (step 706) in parallel with the zero-cross detection, then written into the central zero-cross memory circuit 14 (step 707) and it is determined whether all the pixels in the central section 10b of the line sensor have been completely read-out, based on the count value of a first counter 50 (step 708) while said first counter 50 is counted up (step 709). The address in which the data is to be stored is assigned according to said equation (9).

If all the pixels in the central section 10b of the line sensor have been read-out and conclusion of the step 708 is YES, the routine proceeds to a step 803 (FIG. 8) to detect read-out of the first pixel in the right side section 20b of the line sensor, based on a count value of the read-out pixel number counter while the pixels are output one by one (step 804). If read-out of said first pixel has started, the first counter 50 is reset (step 805). Then, the same routine those for the left side section 30b and the central section 10b of the line sensor 8 is repeated for the right side section 20b of the line sensor 8. More specifically, the pixels in this right side section 20b are read-out one by one (step 806) in parallel with the zero-cross detection, then written into the right side zero-cross memory circuit 24 (step 807) and it is determined whether all the pixels in the right side section 20b of the line sensor have been completely read-out or not (step 808) while the first counter 50 is counted up (step 809). The data written into the right side zero-cross memory circuit 24 is stored in the address assigned according to said equation (10), based on the count signal from the first counter 50.

If read-out of all the pixels in the line sensor 8 has been completed and thus conclusion of the step 808 is YES, the routine proceeds to a step 901 (FIG. 9) to reset the first counter 50. Next, data are read out from the zero-cross memory circuits 14, 24, 34 (step 902) and the coincidence detecting circuit 70 determines whether the data from the central zero-cross memory circuit 14, the right side zero-cross memory circuit 24 and the left side zero-cross memory circuit 34 coincide or not (step 903). If a coincidence is detected, the routine proceeds to a step 904 to write a current value of the first counter's count signal (COUNTER 1) as address data and a current value of the second counter's count signal (COUNTER 2) as range data into the data memory circuit 80. If determination of the step 903 is NO, the routine proceeds to a step 905 to determine whether the memory data (reference data) corresponding to all the effective pixels in the central section 10b have been completely read-out or not, based on count value of the first counter 50. If not, the routine proceeds to a step 906 to count up the first counter 50 and thereafter returns to the step 902 to repeat the steps 902 through 905.

After read-out of the reference data has been completed, the routine proceeds from the step 905 to a step 907 to determine whether the data in the right and left side zero-cross memory circuits 24, 34 have been shifted by a specified amount and the above-mentioned steps 901 through 905 have been executed (shift read-out) or not, based on a count value of the second counter 60 (step 907).

If the shift read-out has not been completed, the second counter 60 is counted up and thereafter the routine returns to the step 901. Then, the steps 902 through 905 are repeated. After the shift read-out has been completed, the routine proceeds to a step 909.

Read-out of the memory data during these steps 901 through 908 with the help of the address computing circuits 15, 25, 35 which designate the respective addresses according to the following equations corresponding to the previously mentioned equations (9), (10), (11), respectively:

$$\text{ADDRESS} = \text{COUNTER 1} \quad (12)$$

for the central zero-cross memory circuit 14, $$\text{ADDRESS} = \text{COUNTER 1} + \text{COUNTER 2} \quad (13)$$

for the right side zero-cross memory circuit 24, and $$\text{ADDRESS} = \text{COUNTER 1} + S - \text{COUNTER 2} \quad (14)$$

for the left side zero-cross memory circuit 34. In the equation (14), S represents a constant. A relationship established here between write-in address and read-out address will be explained in reference with FIGS. 10 and 11.

Figures 10A, 10B:
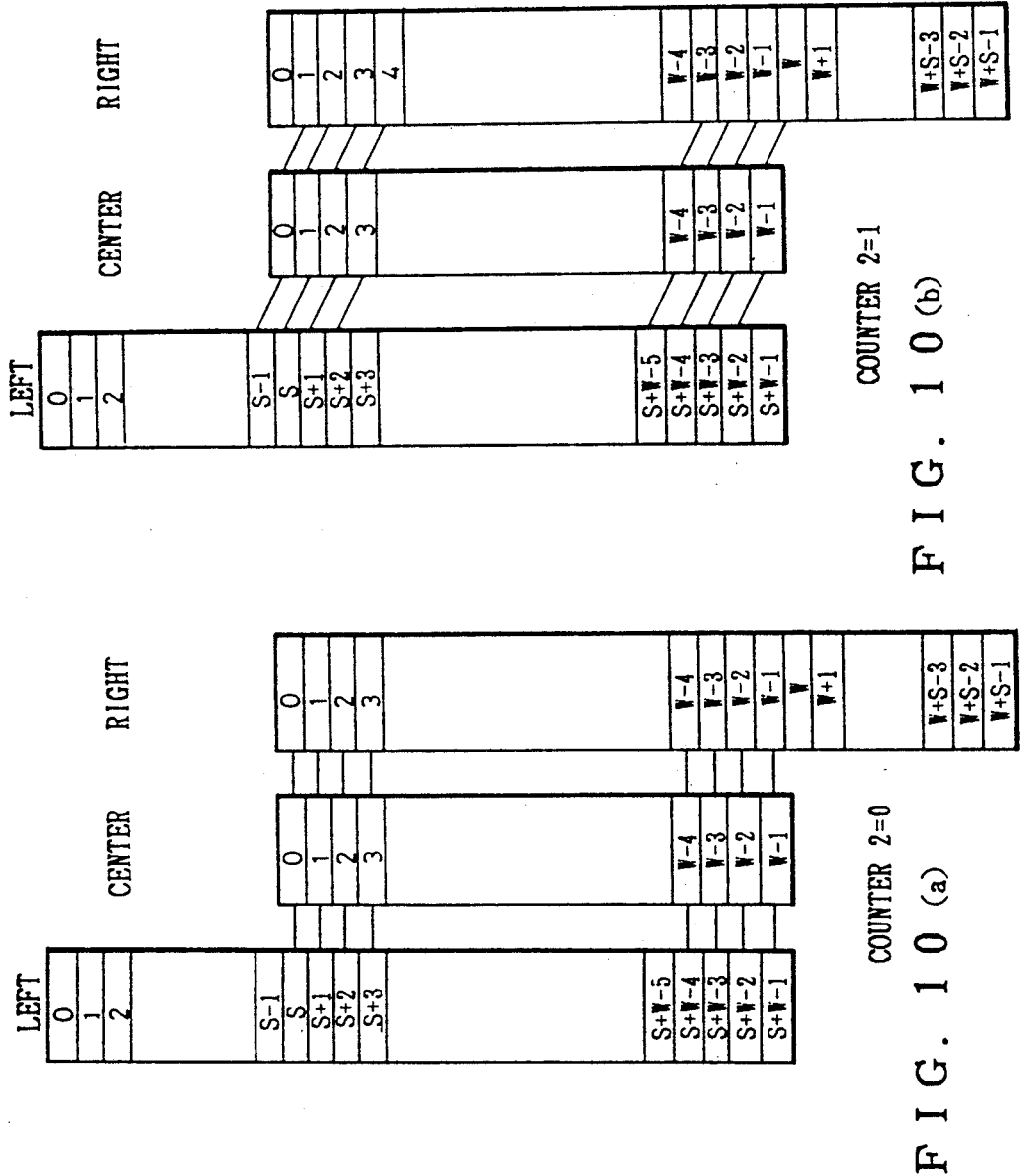
FIGS. 10(*a*) and 10(*b*) comprise a diagram illustrating the procedure executed to read and compare the data stored in the zero-cross memory circuits.

FIG. 10(a) illustrates the case in which the count signal from the second counter 60 is set to 0 (COUNTER 2=0). In such case, the data stored in the addresses corresponding to the respective pixels in the line sensor section 10b, 20b, 30b are successively compared one to another with the first counter 50 being successively incremented from 0 to (W−1) and thereby a coincidence of these data is detected. Accordingly, if COUNTER 2=0, the address will be incremented from 0 to (W−1) for the pixels in the central section 10b as well as the right side section 20b and from S to (S+W−1) for the pixels in the left side section 30b. Then, the second counter 60 is incremented (step 908) and, as indicated by FIG. 10(b), the data stored in the addresses corresponding to the respective pixels in the line sensor sections 10b, 20b, 30b are compared to one another with the first counter 50 being successively incremented from 0 to (W−1) with the count signal of the second counter 60 being set to (COUNTER 2=1) and thereby a coincidence of the data is detected. Accordingly, when COUNTER 2=1, the addresses will be incremented from 0 to (W−1) for the central line sensor section 10b, from 1 to W for the right side line sensor section 20b and from (S−1) to (S+W−2) for the left side line sensor section 30b. In other words, the memory data in the right side zero-cross memory circuit 24 will be subjected to the coincidence detection with a shift of one pixel relative to the memory data in the central zero-cross memory circuit 14.

The coincidence detection will be repeated until the second counter 60 is incremented up to COUNTER 2=S (step 908). FIG. 11(a) illustrates the case of COUNTER 2=S−1 and FIG. 11(b) illustrates the case of COUNTER 2=S.

More specifically, the count value of the second counter 60 at the moment when the memory data in the respective zero-cross memory circuits 14, 24, 34 come in coincidence with one another corresponds to the amount of displacement Xp in the previously mentioned equation (6). At the step 904, this amount of displacement is stored in the data memory circuit 80 as the range data.

If said step 907 determines that read-out of the given shift has been completed, the routine proceeds to a step 909 at which the range data written into the data memory circuit 80 at the step 904 is applied to an objective driver mechanism (not shown) so that the objective may be moved so as to focus the camera on the scene.

In this embodiment, the output signal of the line sensor is A/D converted and the secondary difference is digitally processed for computation, so computation is facilitated and processing time is correspondingly reduced over the arrangement relying on analog processing. Furthermore, this embodiment employs a single line sensor divided into three sections, so both the secondary difference computing circuit and the zero-cross detecting circuit suffice to be single, respectively. Such arrangement advantageously reduces the number of parts.

SECOND EMBODIMENT

The second embodiment is similar to the first embodiment in that output signal of the secondary difference computing circuit 12 is interpolated to detect a zero-cross point and features similar to those of the first embodiment will not be further explained.

A circuit block diagram of the secondary difference computing circuit in the second embodiment is shown in FIG. 12.

As in the first embodiment of FIG. 1, a secondary difference computing circuit 12 is connected to the output side of an A/D converter 9 which is, in turn, connected to the output side of a line sensor 8. The secondary difference computing circuit 12, as will be seen in FIG. 12, successively stores output signal AD of the A/D converter 9 synchronously with clock pulses P2 in memory circuits 12a, 12b comprising D flip-flops and computes a secondary difference according to said equation (8).

Output signal DIFF of said secondary difference computing circuit 12 is, as in the first embodiment, applied to a zero-cross detecting circuit 13 which detects then a zero-cross point of the secondary difference computed by the secondary difference computing circuit 12. In the zero-cross detecting circuit 13, an interpolation computing circuit as shown in FIG. 13 interpolates the secondary difference signal DIFF. More specifically, the interpolation computing circuit stores the secondary difference signal DIFF in memory circuit 13e comprising D flip-flop and multiplies this stored value by (−1) and by N. The data multiplied by N is applied to a data selecting circuit 13f. The data corresponding to a sum of (−1) multiplied data and the secondary difference signal DIFF is added to the output data of the data selecting circuit 13f and this sum data is fedback to the data selecting circuit 13f. Thus, the interpolation computing circuit computes synchronously with a clock pulse P3

$$NDIFF(m) = N*DIFF(n-1) + m*(DIFF(n) - DIFF(n-1)) \quad (15)$$

and thereby linearly approximates the signal DIFF so as to interpolate the secondary difference signal DIFF. Simultaneously, the interpolation computing circuit outputs a sign signal SIGN representing whether said data has a plus sign or a minus sign.

Figure 4:
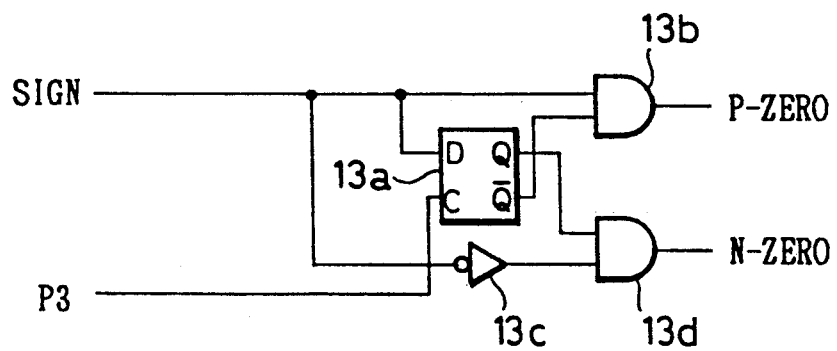
FIG. 4 is a circuit diagram showing the zero-cross detecting circuit in the first embodiment, which is adapted to detect the zero-cross point of the secondary difference signal provided from the secondary difference computing circuit.

As shown by FIG. 4 in connection with the first embodiment, said sign signal SIGN is applied to the D flip-flop 13c of said zero-cross detecting circuit 13, said sign signal SIGN and $\bar{Q}$ terminal of the D flip-flop 13a are tied to the AND circuit 13b, and the output signal of the inverter 13c which is, in turn, applied with said sign signal SIGN and Q terminal of the D flip-flop 13a are tied to the AND circuit 13d.

As indicated by the time chart of FIG. 14, the output signal Vin of the line sensor 8 is applied to the A/D converter 9 which then A/D converts this output signal Vin to the output signal AD. This output signal AD is applied to the secondary difference computing circuit 12 which then output the secondary difference signal DIFF synchronously with the clock pulse P2. The signal DIFF is applied to the zero-cross detecting circuit 13 which, in the first place, linearly approximates said signal DIFF and produces an interpolated signal NDIFF/N and the sign signal SIGN. Synchronously with the clock pulse P3, the AND circuit 13b outputs a zero-cross signal in the form of a pulse P-ZERO which rises up as the sign signal SIGN changes from L to H and the AND circuit 13d outputs a zero-cross signal in the form of a pulse N-ZERO which rises up as the sign signal SIGN changes from H to L. In other words, the pulse P-ZERO is the signal which rises up as the interpolated data NDIFF/N of the secondary difference signal DIFF changes from positive to negative and consequently zero-crosses and the pulse N-ZERO is the signal which rises up as said interpolated data NDIFF/N changes from negative to positive and consequently zero-crosses.

A zero-cross behavior signal waveform provided from said zero-cross detecting circuit 13 is divided into portions associated with the central section 10b, the right side section 20b and the left side section 30b, respectively, of the line sensor and, as in the first embodiment, separately applied to and stored in respective zero-cross memory circuits 14, 24, 34. These zero-cross signal waveform portions are stored, as in the first embodiment, in the respective addresses corresponding to the respective pixels in accordance with said equations (9), (10) and (11).

As in the first embodiment, count signal (COUNTER 2) of a second counter 60 is applied to said address computing circuits 25, 35. Count up and reset of said second counter 60 and said first counter 50 are under control of output signal from the control circuit 40. The second counter 60 increments the addresses for every read-out of data from the zero-cross memory circuits 24, 34, as has already been described. The address computing circuits 25, 35 are supplied from the control circuit 40 with address processing information on the basis of which the address computing circuits 25, 35 output predetermined write/read signals into and from the zero-cross memory circuits 24, 34. The first counter 50 and the second counter 60 operate synchronously with the clock pulse 3 (FIG. 14) having a period shorter than those of the clock pulses P1, P2 for write and read with correspondingly finer split of data.

The routine executed in the second embodiment for write and read of the luminance information on the scene to be photographed is similar to the routine executed in the first embodiment as has previously been described in reference with FIGS. 6 through 9.

Relationship between the write-in address and the read-out address is similar to that as has been mentioned in reference with FIGS. 10 and 11.

As in the first embodiment, the second embodiment allows a processing time required for computation to be shortened since the output signal of the line sensor is A/D converted and digitally computed. Additionally, the second embodiment advantageously reduces the number of parts since the signal line sensor is divided into three sections. Furthermore, this embodiment allows the range to be finely divided with a relatively small number of pixels since the output signal of the secondary difference computing circuit is interpolated.

THIRD EMBODIMENT

Referring to FIGS. 15 through 22, a third embodiment of the range finder includes three line sensors and is arranged so that the luminance information on a scene to be photographed provided from these line sensors is processed without A/D conversion.

Figure 16:
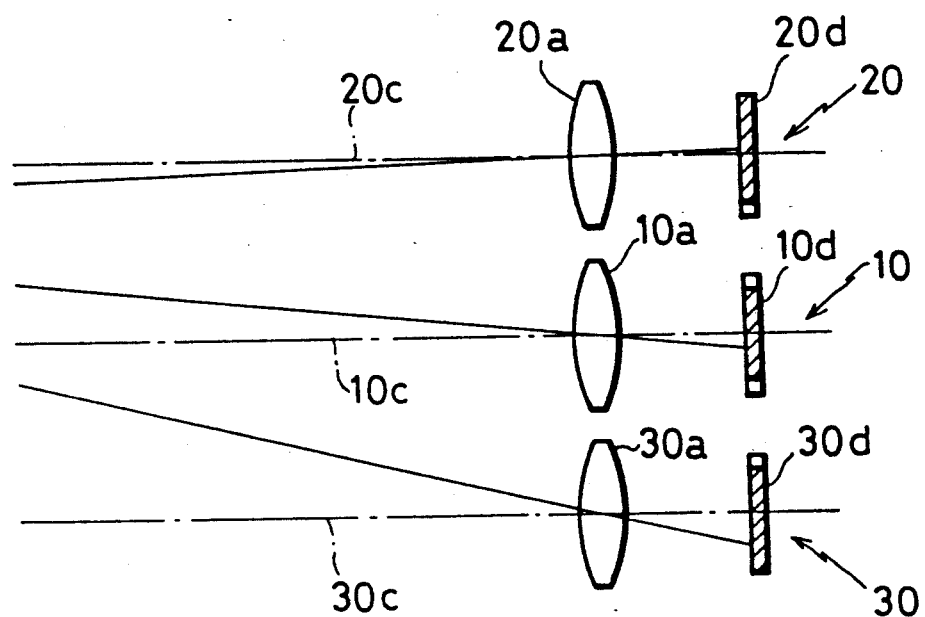
FIG. 16 is side view schematically showing the photosensors in the third embodiment.

Photosensors 10, 20, 30 comprise line sensors which comprise, in turn, photodetector arrays each including an appropriate number of pixels arranged side by side, and imaging lenses combined with said line sensors. Referring to FIG. 16, there are provided on the front side of the photographic camera three imaging lenses 10a, 20a, 30a so that light rays emitted from a scene to be photographed pass through these imaging lenses 10a, 20a, 30a and the scene is imaged on respective line sensors 10d, 20d, 30d placed behind them. These photosensors 10, 20, 30 are designated here as the central sensor 10, the right side sensor 20 and the left side sensor 30 with optical axes 20c, 30c of said right side sensor 20 and said left side sensor 30, respectively, being arranged symmetrically with respect to an optical axis 10c of the central sensor 10. Said line sensors 10d, 20d, 30d are designated here as the central line sensor 10d, the right side line sensor 20d and the left side line sensor 30d.

Figure 15:
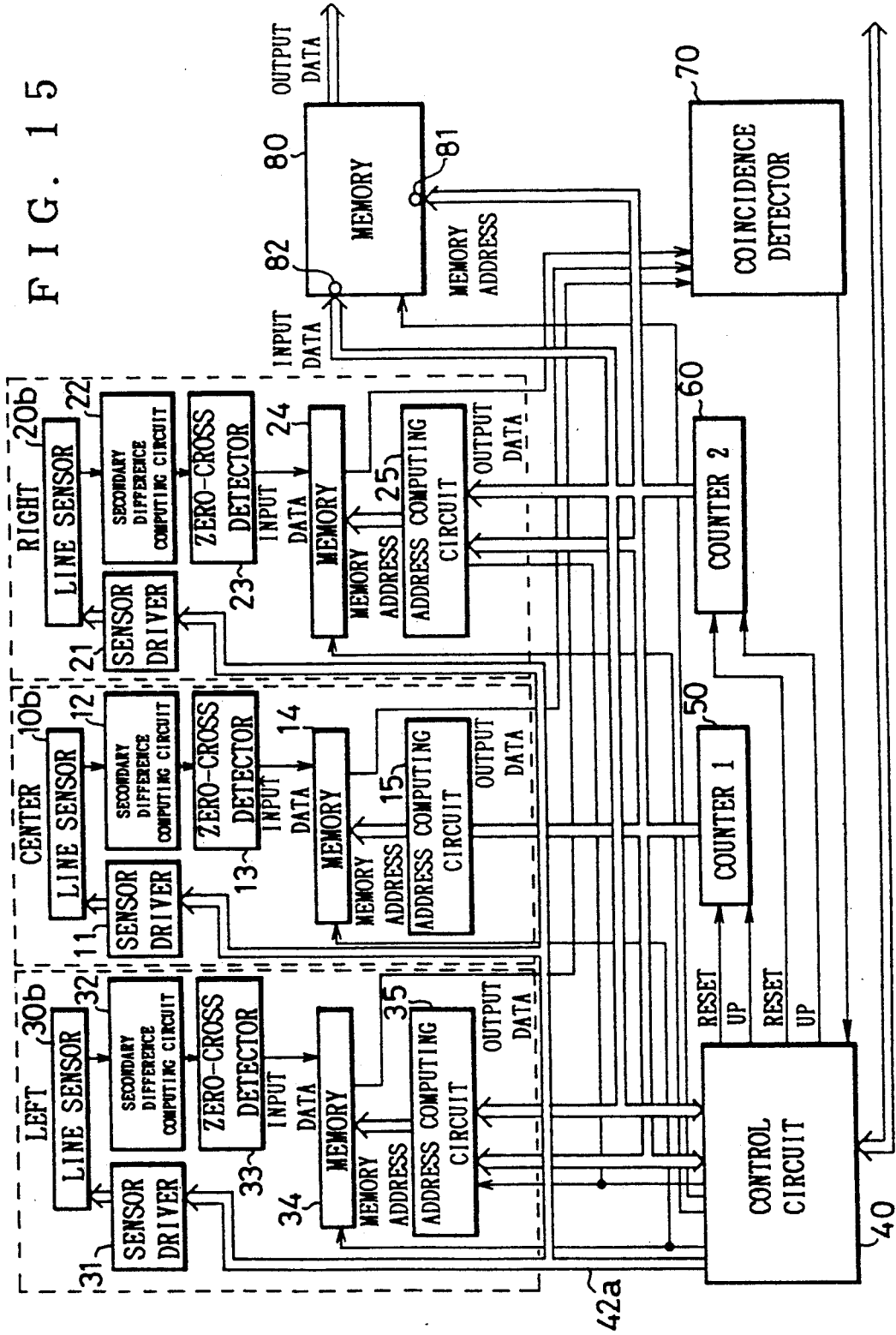
FIG. 15 is a circuit block diagram showing a third embodiment of the range finder for passive type autofocussing device constructed in accordance with the invention.

Said line sensors 10d, 20d, 30d are separately applied, as illustrated in FIG. 15, with driver signals from respective sensor drivers 11, 21, 31 and begin to pick up the light rays coming from the scene on the basis of said driver signals. The sensor drivers 11, 21, 31 are connected to a control circuit 40 via a drive control signal link 40a and controlled by a drive control signal output from said control circuit 40.

Figure 17:
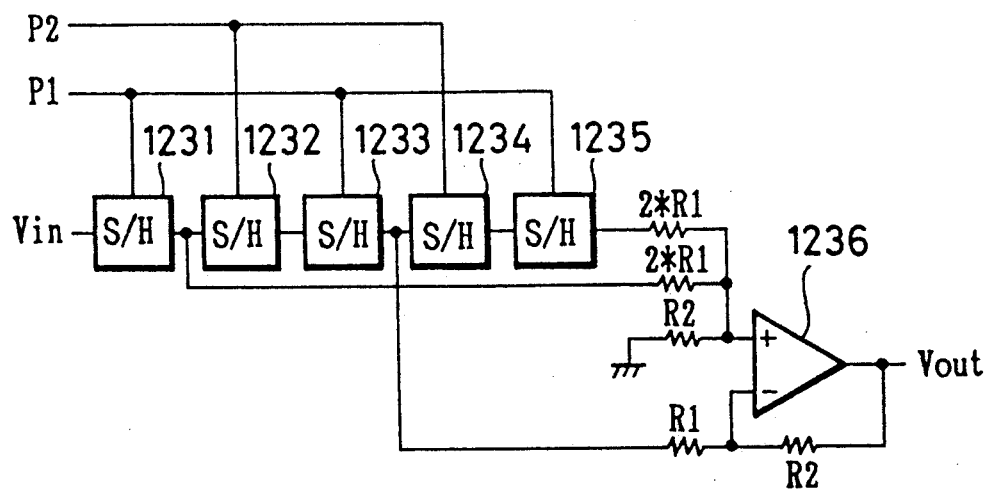
FIG. 17 is a circuit diagram showing the secondary difference computing circuit in the third embodiment, which is adapted to compute the secondary difference from the output of the line sensor.
Figure 18:
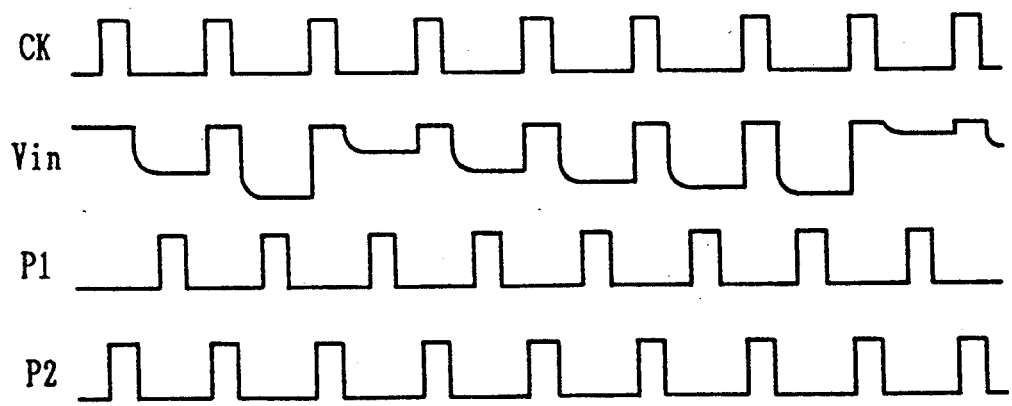
FIG. 18 is a time chart for the circuit of FIG. 17.
Figure 19:
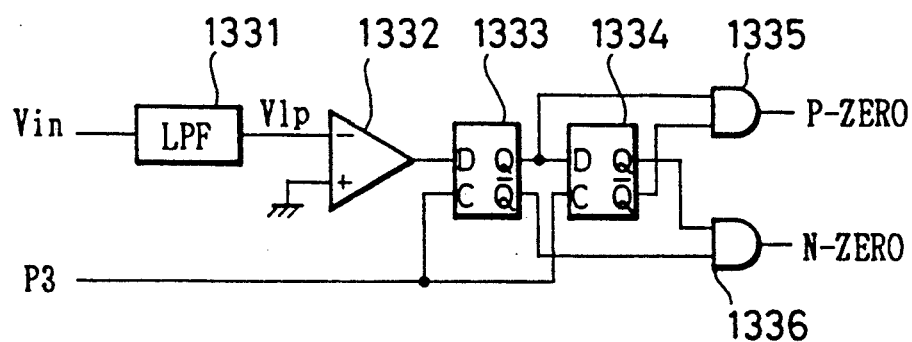
FIG. 19 is a circuit diagram showing the zero-cross detecting circuit in the third embodiment, which is adapted to direct the zero-cross point form the secondary difference signal provided from the secondary difference computing circuit.
Figure 21A:
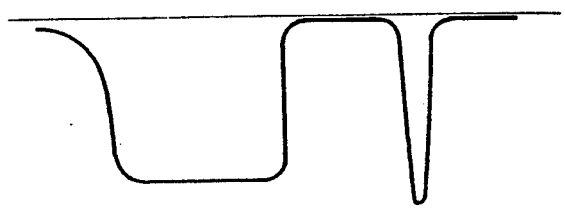
FIGS. 21(a), 21(b), and 21(c) are diagrams showing the luminance distribution on the scene and primary and secondary differences therefor.
Figure 21B:
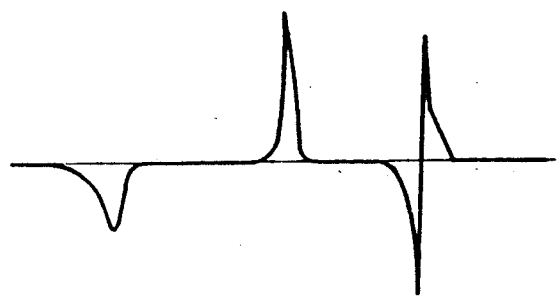
Figure 21C:
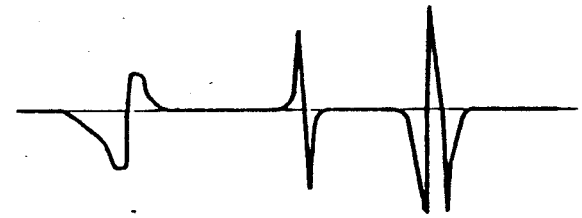
Figure 23:
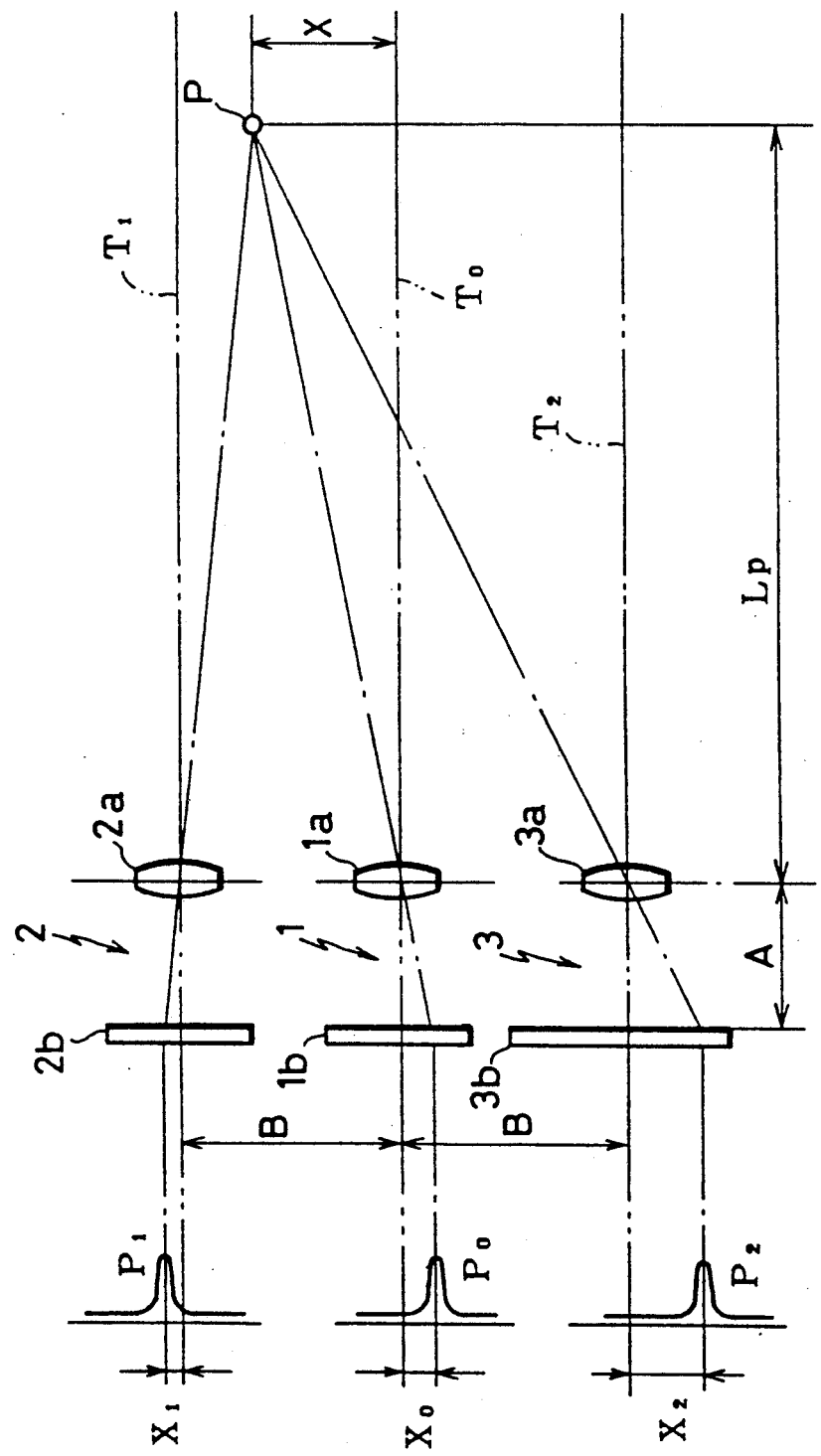
FIG. 23 is an optical path diagram illustrating a principle of range finding.
Figures 24A, 24B, 24C:
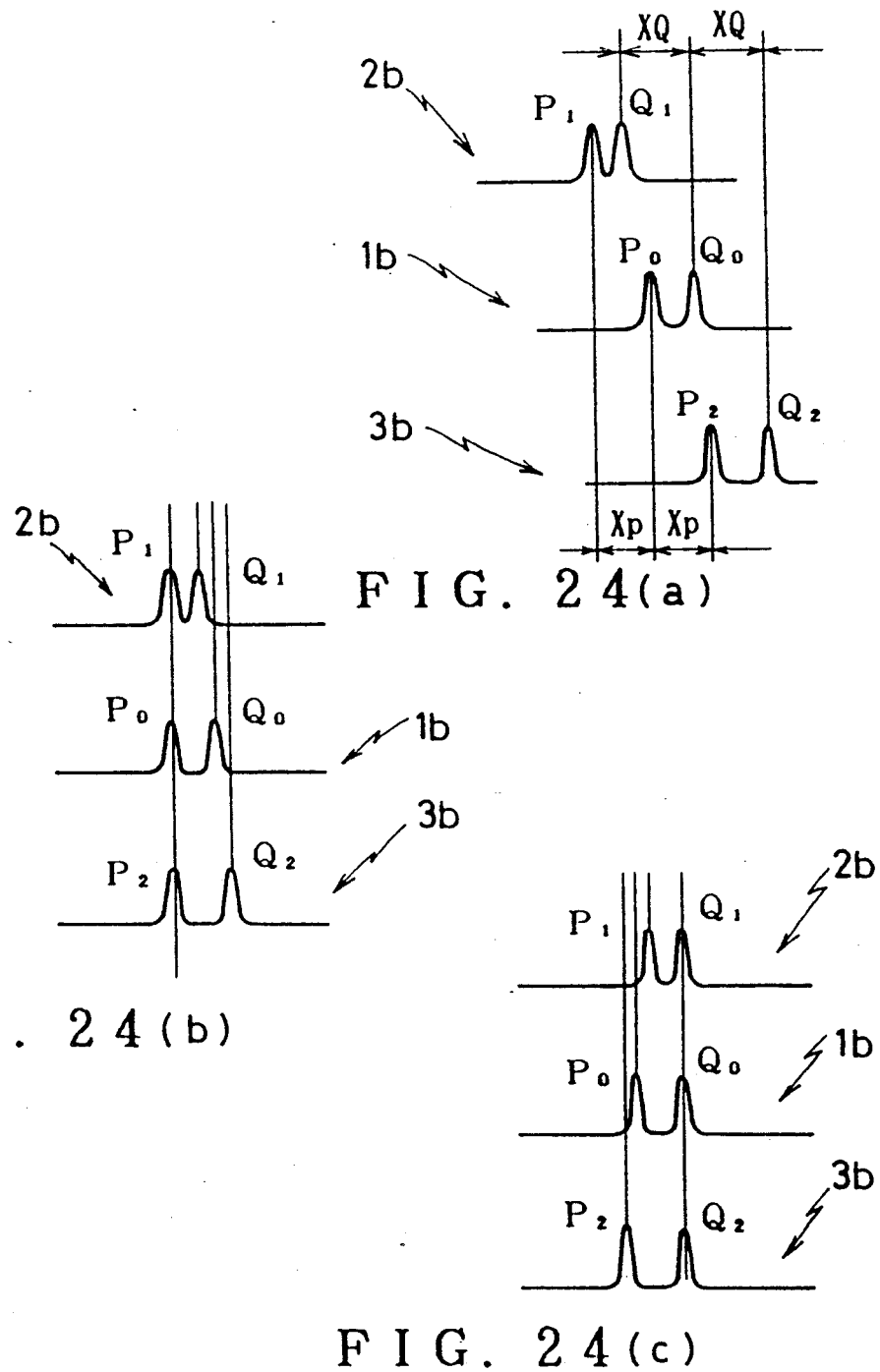
FIGS. 24(a), 24(b) and 24(c) are signal diagrams corresponding to the luminance distribution of the scene detected by the photodetector arrays, illustrating the procedure according to the principle of range finding.

As will be apparent from FIG. 15, secondary difference computing circuits 12, 22, 32 are connected to output terminals of said line sensors 10d, 20d, 30d, respectively, and said secondary difference computing circuits 12, 22, 32 compute secondary differences of the luminance disribution signals on the scene which have been provided from the respective line sensors 10d, 20d, 30d. Referring to FIG. 17, said secondary difference computing circuits 12, 22, 32 utilize sample holding circuits 1231, 1232, 1233, 1234, 1235 to shift and sample successively output signals Vin from the respective pixels of the line sensors 10d, 20d, 30d, as illustrated in FIG. 17, and utilize an operational amplifier 1236 and resistors of appropriate values to calculate $$V\text{out} = (R2/(2*R1))*(V\text{in}(n-1) + V\text{in}(n)) \quad (16)$$

in order to determine the secondary difference. A time chart for these secondary difference computing circuits 12, 22, 32 is illustrated by FIG. 18. Referring to FIG. 21, (a) represents a distribution waveform presented by the luminance on the scene to be photographed, (b) represents a primary difference waveform and (c) represents a secondary difference waveform thereof.

As illustrated in FIG. 15, output signals of said secondary difference computing circuits 12, 22, 32 are applied to zero-cross detecting circuits 13, 23, 33, respectively, which detect then zero-cross points of the respective secondary differences provided from the secondary difference computing circuits 12, 22, 32. As will be seen in FIG. 19, the output signal Vin from the secondary difference computing circuit 12 (22, 32) is applied to a low-pass filter 1331 of the zero-cross detecting circuit 13 (23, 33) and output signal Vlp from said low-pass filter 1331 is applied to an input terminal of a comparator 1332 of which the reference terminal is grounded. Output signal of the comparator 1332 is successively applied to D flip-flops 1333, 1334. Q terminal of the flip-flop 1333 and $\bar{Q}$ terminal of the flip-flop 1334 are tied to an AND circuit 1335 while $\bar{Q}$ terminal of the flip-flop 1333 and Q terminal of the flip-flop 1334 are tied to an AND circuit 1336.

Figure 20:
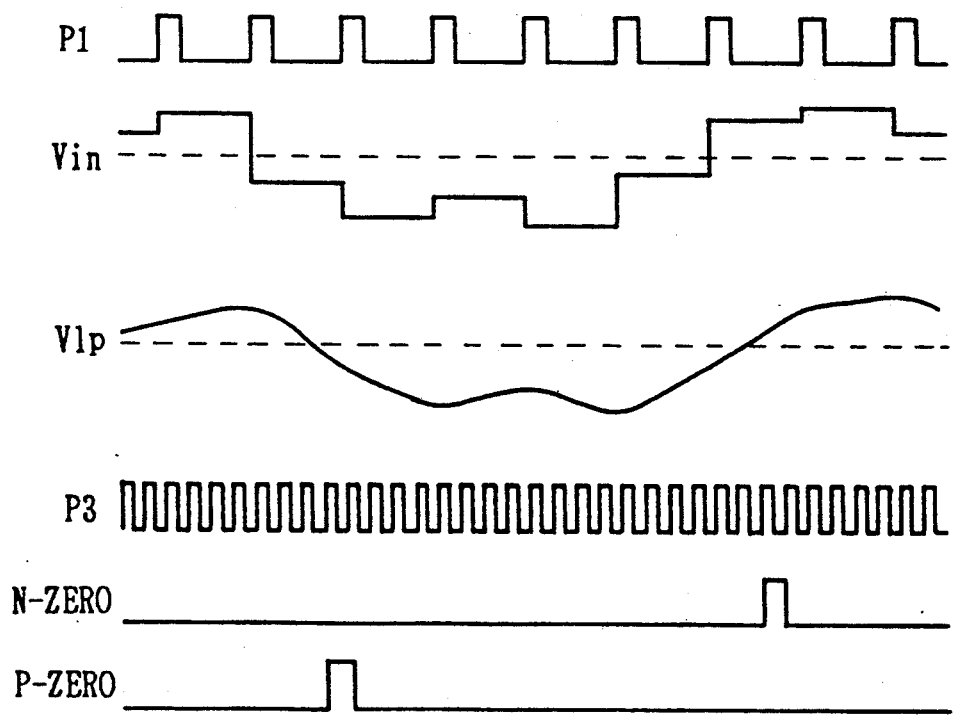
FIG. 20 is a time chart for the circuit of FIG. 19.

The output signal Vlp of said low-pass filter 1331 presents a waveform as shown by FIG. 20 corresponding to a waveform of the interpolated output signal Vin of the secondary difference computing circuit 12. Upon application of this output signal Vlp synchronously with the clock pulse P3, the AND circuit 1335 outputs a zero-cross signal in the form of a pulse P-ZERO which rises up as the signal Vlp changes from positive to negative while the AND circuit 1336 outputs a zero-cross signal in the form of a pulse N-ZERO which rises up as the signal Vlp changes from negative to positive.

Zero-cross behavior signal waveforms provided from said zero-cross detecting circuits 13, 23 are applied to zero-cross memory circuits 14, 24, 34 and stored therein, respectively. These zero-cross behaviors are then stored in addresses which are output from respective address computing circuits 15, 25, 35 according to the pixel locations in the respective line sensors 10d, 20d, 30d. More specifically, the counter signals (COUNTER 1) are applied from a first counter 50 to the address computing circuits 15, 25, 35 for successive increment and said zero-cross behavior signal waveforms are stored in the respective addresses corresponding to the respective pixels in accordance with the following equations:

$$\text{ADDRESS} = \text{COUNTER 1} - S \quad (17)$$

for the central memory circuit 14, $$\text{ADDRESS} = \text{COUNTER 1} - S \quad (18)$$

for the right side memory circuit 14, and $$\text{ADDRESS} = \text{COUNTER 1} \quad (19)$$

for the left side memory circuit 34. In the equations (17) and (18), S represents a constant.

Count signals (COUNTER 2) from a second counter 60 are applied to said address computing circuits 25, 35. Count up and reset of said second counter 60 and said first counter 50 are under control of output signal from the control circuit 40. The second counter 60 increments the address for every read-out of data from the zero-cross memory circuits 24, 34, as will be described later. The address computing circuits 15, 25, 35 are also supplied from the control circuit 40 with address processing information on the basis of which the address computing circuits 15, 25, 35 output predetermined write/read signals into and from the zero-cross memory circuits 14, 24, 34. Said first counter 50 and said second counter 60 operate synchronously with the clock pulse P3 (FIG. 20) of a period shorter than those of the clock pulses P1, P2 so that data may be finely split when written and read.

The count signal from the first counter 50 is applied to an address port 81 of a data memory circuit 80 while the count signal from the second counter 60 is applied to a range data port 82 of said data memory circuit 80. Both the count signals from the first counter 50 and the second counter 60 are also applied to the control circuit 40. The control circuit 40 supplies the data memory circuit 80 with a data memory signal on the basis of which the address data and the range data are stored in the data memory circuit 80.

Now referring to FIGS. 22 and 9, a routine to write and read the luminance information memory for a scene to be photographed will be described.

Upon start of range finding, charge accumulation occurs on the respective line sensors 10d, 20d, 30d (step 2201), then the second counter 60 is reset (step 2202) and the first counter 50 also is reset (step 2203). Data corresponding to a single pixel in each line sensor 10d, 20d, 30d is read out (step 2204), the data thus read out are written into the respective zero-cross memory circuits 14, 24, 34 (step 2205). It should be understood here that zero-cross detection is executed between the step 2204 and the step 2205. Next, the routine proceeds to a step 2206 to determine whether read-out concerning all the pixels has been completed or not, based on a count value of the first counter 50. If not, the routine now proceeds to a step 2207 to count up the first counter 50 and then returns to the step 2204 to read respective single pixels, followed by writing them into the zero-cross memory circuits 14, 24, 34 (step 2205). The data written into the zero-cross memory circuits 14, 24, 34 are stored in the addresses assigned by the address computing circuits 15, 25, 35, based on the count signals from the first counter 50. The addresses in which the data are to stored are assigned according to the above-mentioned equations (17), (18), (19). It should be understood that, when the addresses are negative, no write-in occurs.

If read-out of the data corresponding to all the pixels has been completed and conclusion of said step 2206 is YES, the routine then proceeds to a step 901 (FIG. 9) to reset the first counter 50.

The third embodiment allows the range to be finely divided with a relatively small number of pixels since the output signal of the secondary difference computing circuit is interpolated.

EFFECT OF THE INVENTION

As will be apparent from the foregoing description, the range finder for passive type autofocussing device of the present invention is so arranged that a luminance on scene to be photographed is picked up by three line sensors, secondary differences are computed from the luminance data, three zero-cross data characterizing zero-cross points of said respective secondary differences are stored, said three zero-cross data are compared with one another to detect a zero-cross coincidence of these three data with one of said three zero-cross data being selected as a reference data and the other two zero-cross data being successively shifted by one pixel at a time. Such arrangement improves the operation speed over the conventional arrangement adapted to obtain the range data by correlative operation. In this way, the present invention allows a dynamic scene or object to be photographed to be reliably picked up and to be rapidly brought into focus.

In addition, the present invention allows the range data to be obtained with high precision, since the zero-cross data of secondary differences are compared with one another independently of luminance distribution pattern presented by the scene on the line sensors.

What is claimed is:

1. Range finder for passive type autofocussing device, said range finder comprising a photosensor to pick up a luminance distribution of a scene to be photographed, said photosensor consisting of a single line sensor divided into three sections and three imaging lenses adapted to image the scene on the respective sections of the line sensor, a single secondary difference computing circuit to A/D convert an output signal from said line sensor and to compute a secondary difference of the digitalized value, a single zero-cross detecting circuit to detect a zero-cross point of an output signal from said secondary difference computing circuit, zero-cross memory circuits associated with said three sections of said line sensor, respectively, for storage of zero-cross behavior signals provided from said zero-cross detecting circuit, and a coincidence detecting circuit adapted to compare the zero-cross behavior signals stored in said respective zero-cross memory circuit with one another and thereby to detect a coincidence of these zero-cross behavior signals, wherein one of said three line sensor sections is selected as a reference sensor section and the zero-cross behavior signals provided from the other two sensor sections are successively shifted relative to the zero-cross behavior signal provided from said reference sensor section until a coincidence of these zero-cross behavior signals is detected by said coincidence detecting circuit and a range to the scene is computed from an amount of said shift.

2. Range finder for passive type autofocussing device as recited in claim 1, wherein said zero-cross detecting circuit is adapted to detect a zero-cross point by interpolating the output signal from said secondary difference computing circuit.

3. Range finder for passive type autofocussing device, said range finder comprising three photosensors to pick up a luminance distribution of a scene to be photographed, secondary difference computing circuits to compute secondary differences of output signals from said respective photosensors, zero-cross detecting circuits to interpolate output signals from said respective secondary difference computing circuits and thereby to detect zero-cross points of said output signals, zero-cross memory circuits in which the zero-cross behavior signals provided from said respective zero-cross detecting circuits are stored, and a coincidence detecting circuit adapted to compare the zero-cross behavior signals stored in said respective zero-cross memory circuits with one another and thereby to detect a coincidence of these zero-cross behavior signals, wherein one of said three photosensors is selected as a reference photosensor and the zero-cross behavior signals provided from the other two photosensors are successively shifted relative to the zero-cross behavior signal provided from said reference photosensor until a coincidence of these zero-cross behavior signals is detected by said coincidence detecting circuit and a range to the scene is computed from an amount of said shift.

4. Range finder for passive type autofocussing device as recited in claim 3, wherein said zero-cross detecting circuits are adapted to detect zero-cross points by interpolating the output signals of the respective secondary difference computing circuits.

5. Range finder for passive type autofocussing device, said range finder comprising three photosensors to pick up a luminance distribution of a scene to be photographed, secondary difference computing circuits to compute secondary differences of the output signals provided from said respective photosensors, zero-cross detecting circuits to interpolate the output signals provided from said respective secondary difference computing circuits and thereby to detect zero-cross points thereof, zero-cross memory circuits to store zero-cross behavior signals provided from said respective zero-cross detecting circuits, and a coincidence detecting circuit to compare the zero-cross behavior signals stored in said respective zero-cross memory circuits with one another and thereby to detect a coincidence of these zero-cross behavior signals, wherein one of said three photosensors is selected as a reference photosensor and the zero-cross behavior signals provided from the other two photosensors are successively shifted relative the zero-cross behavior signal provided from said reference photosensor until a coincidence of these zero-cross behavior signals is detected by said coincidence detecting circuit and a range to the scene is computed from an amount of said shift.

6. Range finder for passive type autofocussing device, said range finder comprising a photosensor to pick up a luminance distribution of a scene to be photographed, said photosensor consisting of a single line sensor divided into three sections and three imaging lenses adapted to image the scene on the respective sections of the line sensor, a single secondary difference computing circuit to compute secondary differences of the output signals from said respective sections of the line sensor, a single zero-cross detecting circuit to interpolate the output signal of said secondary difference computing circuit and thereby to detect a zero-cross point thereof, zero-cross memory circuits adapted for separately storing zero-cross behavior signals provided from said zero-cross detecting circuit in association with said three sections of the line sensor, a coincidence detecting circuit adapted to compare the zero-cross behavior signals stored in said respective zero-cross memory circuits with one another and thereby to detect a coincidence of these zero-cross behavior signals, wherein one of said three line sensor sections is selected as a reference section and the zero-cross behavior signals provided from the other two sections are appropriately shifted to the zero-cross behavior signal provided from said reference section until a coincidence of these zero-cross behavior signals is detected by said coincidence detecting circuit and a range to the scene is computed from an amount of said shift.

* * * * *

UNITED STATES PATENT AND TRADEMARK OFFICE
CERTIFICATE OF CORRECTION

PATENT NO. : 5,189,461
DATED : February 23, 1993
INVENTOR(S) : Minoru Ishiguro

It is certified that error appears in the above-indentified patent and that said Letters Patent is hereby corrected as shown below:

Column 1, line 53:
  "of the" should be --on the--.

Column 2, line 3:
  "imagining" should be --imaging--.

Column 5, line 23:
  "direct" should be --detect--.

Column 5, line 23:
  "form" should be --from--.

Column 9, line 55:
  "section" should be --sections--.

Column 10, line 52:
  "in FIG. 12" should be --by FIG. 12--.

Column 13, line 4:
  "disribution" should be --distribution--.

Column 14, line 5:
  "circuit 14" should be --circuit 24--.

UNITED STATES PATENT AND TRADEMARK OFFICE
CERTIFICATE OF CORRECTION

PATENT NO. : 5,189,461
DATED : February 23, 1993
INVENTOR(S) : Minoru Ishiguro

It is certified that error appears in the above-indentified patent and that said Letters Patent is hereby corrected as shown below:

Column 14, line 63:
    After "are to" insert --be--.

Signed and Sealed this

Thirteenth Day of September, 1994

Attest:

BRUCE LEHMAN

Attesting Officer     *Commissioner of Patents and Trademarks*